United States Patent [19]

Ishitaka et al.

[11] Patent Number: 5,725,915
[45] Date of Patent: Mar. 10, 1998

[54] LIQUID CRYSTAL DISPLAY

[75] Inventors: Yoshihiko Ishitaka; Mitsuru Kano, both of Miyagi-ken, Japan

[73] Assignee: Alps Electric Co., Ltd., Tokyo, Japan

[21] Appl. No.: 532,957

[22] Filed: Sep. 21, 1995

[30] Foreign Application Priority Data

Sep. 21, 1994 [JP] Japan ................... 6-227067

[51] Int. Cl.$^6$ .................................... G02F 1/1337
[52] U.S. Cl. .................. 428/1; 349/96; 349/106; 349/123; 349/128
[58] Field of Search .................... 428/1; 359/75, 359/76; 349/96, 106, 123, 128

[56] References Cited

U.S. PATENT DOCUMENTS

| | | | |
|---|---|---|---|
| 4,127,322 | 11/1978 | Jacobson et al. | 353/31 |
| 4,232,947 | 11/1980 | Funada et al. | 350/341 |
| 4,252,414 | 2/1981 | Kinugawa et al. | 350/339 |
| 4,256,377 | 3/1981 | Krueger et al. | 350/340 |
| 4,357,374 | 11/1982 | Ogawa | 428/1 |
| 4,370,194 | 1/1983 | Shaver et al. | 156/643 |
| 4,521,080 | 6/1985 | Funada et al. | 350/341 |
| 4,702,945 | 10/1987 | Etzbach et al. | 428/1 |
| 4,850,680 | 7/1989 | Yamazaki et al. | 350/340 |
| 4,892,392 | 1/1990 | Broer | 350/339 |
| 4,948,708 | 8/1990 | Veenvliet et al. | 430/316 |
| 5,067,797 | 11/1991 | Yokokura et al. | 359/76 |
| 5,073,294 | 12/1991 | Shannon et al. | 252/299.01 |
| 5,155,610 | 10/1992 | Hikmet et al. | 359/75 |
| 5,438,421 | 8/1995 | Sugawara | 428/1 |

FOREIGN PATENT DOCUMENTS

| | | |
|---|---|---|
| 52-148149 | 11/1982 | Japan . |
| 57-192926 | 11/1982 | Japan . |
| 58-100121 | 6/1983 | Japan . |
| 62-249124 | 10/1987 | Japan . |
| 63-136024 | 6/1988 | Japan . |
| 63-214721 | 9/1988 | Japan . |
| 1-137237 | 5/1989 | Japan . |
| 1-145628 | 6/1989 | Japan . |
| 2-283638 | 11/1990 | Japan . |
| 4-9007 | 1/1992 | Japan . |

OTHER PUBLICATIONS

Jpn. J. Appl. Phys. vol. 31 (1992) pp. 2155–2164, Part 1, No. 7, Jul. 1992, "Surface-Induced Parallel Alignment of Liquid Crystals by Linearly Polymerized Photopolymers" by Martin Schadt, Klaus Schmitt, Vladimir Kozinkov and Vladimir Chigrinov.

*Primary Examiner*—Nasser Ahmad
*Attorney, Agent, or Firm*—Guy W. Shoup

[57] ABSTRACT

A liquid crystal display having heat resistance, a sufficiently large pretilt angle, and capable of preventing generation of domains and improving the reliability thereof is disclosed. Each alignment layer has, on the surfaces thereof, roof-like concave and convex rows, formed by repeatedly, in a first direction, forming convex portions each consisting of a longer side portion and a shorter side portion, and valley-like concave and convex rows having the height that is lower than that of the roof-like concave and convex rows and formed in the same direction as that of the roof-like concave and convex rows in such a manner that the roof-like concave and convex rows and the valley-like concave and convex rows are adjacently and alternately formed. Thus, concaves and convexes having a unit length of repetition, that is shorter than a unit length of repetition of the concaves and convexes formed in the first direction, are formed in a second direction that is substantially perpendicular to the first direction. Furthermore, the alignment layer is made of a compound having main chains, that are stable with respect to UV light, and side chains, each of which has an aliphatic ringing group to which aromatic groups are bonded, and which cross-link between the main chains, wherein the aromatic groups are aligned substantially in the first direction.

4 Claims, 7 Drawing Sheets

FIRST DIRECTION →

LIQUID CRYSTAL DISPLAY

BACKGROUND OF THE INVENTION

1. Field of the invention

This invention relates to a liquid crystal display that contains liquid crystal molecules that are aligned into a predetermined direction to display a variety of images, and, more particularly, to an alignment layer, a polarizing filter or a color filter of the liquid crystal display device.

2. Description of the Related Art

In recent years, a variety of displays, such as an image display apparatus connected to a TV set or a computer, have been required to have a light weight, thin shape and small electric power consumption. Under the foregoing circumstance, excellent liquid crystal displays have been desired in order to realize flat displays that satisfy the foregoing requirements.

In particular, attention has been focused on color liquid crystal displays of a type that is capable of forming further clear images and exhibiting excellent visibility.

An example of the color liquid crystal display is shown in FIG. 11.

A color liquid crystal display 110 shown in FIG. 11 comprises a pair of substrates 111 and 112 disposed to face each other; liquid crystals 113 enclosed between the substrates 111 and 112; liquid crystal drive devices 114 formed on the substrate 111; transparent electrodes 115 (115a, 115b and 115c) connected to the liquid crystal drive devices 114; an opposite electrode 117 formed on the other substrate 112 to face the transparent electrodes 115; alignment layers 116 for holding the liquid crystals 113 therebetween; polarizing filters (a lower polarizing filter 123 and an upper polarizing filter 124) respectively formed on the pair of the substrates 111 and 112; and color filters 119 (120, 121 and 122) formed on the substrate 112.

Each of the substrates 111 and 112 is made of a base, through which light is transmitted, and which usually comprises a glass plate.

The liquid crystals 113 contain molecules, the alignment state of which is changed when voltage is applied thereto. In TN liquid crystal taken as an example shown in FIG. 11, rows of molecules twisted by 90° in a state where no voltage is applied are stood erect and twisting is suspended when voltage is applied to the same. A spacer in the form of particles (not shown in FIG. 11) is disposed between the two alignment layers 116, the spacer maintaining the gap, in which the liquid crystals 113 are enclosed, at a predetermined distance.

The liquid crystal drive devices 114 comprise thin film transistors (TFTs) or the like that transmit drive signals to control the voltage to be applied to the liquid crystals.

The transparent electrodes 115 and the opposite electrode 117 formed on the other substrate 112 form pairs so as to apply, to the liquid crystals 113, the voltage supplied from the liquid crystal drive devices 114, the transparent electrodes 115 usually comprising ITO films (indium-tin oxide films).

Although the liquid crystal drive devices 114 and the transparent electrodes 115 (115a, 115b and 115c) are provided for respective pixels, the opposite electrode 117 is usually formed into one electrode that is common to all pixels.

The alignment layers 116 align the liquid crystals 113 into a predetermined direction and made of organic polymer films.

The polarizing filters 123 and 124 are films having a function of emitting linear polarization. In the illustrated liquid crystal display 110, the lower filter 123 and the upper filter 124 are so formed on the corresponding substrates 111 and 112 that their polarizing directions are different from each other by 90°.

The color filter 119 is employed in a color liquid crystal display and is usually formed into a set that consists of a red color filter 120, a green color filter 121 and blue color filter 122 that are provided for each pixel. Thus, the color liquid crystal display uses combination of the foregoing three colors to express a variety of colors.

In the color liquid crystal display shown in FIG. 11, initially, light beams are, as back light, allowed to pass through the lower polarizing filter 123 from a position below the polarizing filter 123. At this time, only the light beams, that have been polarized in the horizontal direction when viewed in FIG. 11, are allowed to pass through the lower polarizing filter 123.

The example shown in FIG. 11 illustrates a state where control performed by the liquid crystal drive devices 114 causes no electric current to flow through the transparent electrodes 115a and 115b but causes the voltage to be applied to only liquid crystals locating on the transparent electrode 115c.

In the foregoing state, the polarized light beams are allowed to pass through the lower polarizing filter 123, followed by being allowed to pass through the glass substrate 111 and the alignment layers 116. Then, the direction of polarization of only the polarized light beams along the twisted liquid crystal molecules on the transparent electrodes 115a and 115b is converted, followed by being allowed to pass through the upper polarizing filter 124. The direction of polarization of the polarized light beams allowed to pass through the transparent electrode 115c is not converted, followed by being interrupted by the upper polarizing filter 124.

By disposing the color filter 120 that passes only red components, the color filter 121 that passes only green components and the color filter 122 that passes only blue components such that they face the respective transparent electrodes 115a, 115b and 115c, blue light beams are not allowed to pass to a position above the upper polarizing filter 124, whereas only red and green light beams are allowed to pass through. As a result, a yellow image is displayed.

A liquid crystal display of the foregoing type comprises the alignment layers, each of which must be provided with a pretilt angle by inclining the surface thereof in order to align the liquid crystals into a predetermined direction.

The liquid crystal display has a critical problem of generation of so-called domains.

It has been known that the generation of the domains can be prevented by providing a sufficiently large pretilt angle (usually 1° or larger) for the alignment layer.

As a method of manufacturing the alignment layer, there have been known a method that uses a rubbing process in which a film made of an insulating material, such as polyimide resin, is rubbed in one direction by a cloth or the like, and a method with which the alignment layer is formed by diagonally evaporating silicon dioxide ($SiO_2$).

However, an alignment layer formed by the rubbing process suffers from a problem in that dust and static electricity are undesirably generated when the rubbing operation is performed with the cloth to manufacture the alignment layer.

On the other hand, the method performing the diagonal evaporation encounters problems in that the manufacturing cost cannot be reduced and that the alignment layer cannot be formed over a large area. Therefore, the foregoing method is not suitable to manufacture a relatively large liquid crystal display.

In recent years, to overcome the foregoing problems, a method has attracted attention, in which a stamping method is used to manufacture the alignment layer. The method of manufacturing the alignment layer employing the stamping method comprises the step of pressing a mold, that has, on the surface thereof, a concave and convex pattern to be stamped, against a resin film formed on the substrate while heating the resin film so as to stamp the concave and convex pattern on the surface of the resin film. Generally, the surface of the alignment layer manufactured by the foregoing mold has a shape having a multiplicity of parallel concaves repeatedly formed on the substrate.

However, the liquid crystal display comprising the alignment layer simply having the concave and convex pattern formed by the stamping method suffers from unsatisfactory anchoring strength. Thus, if external force or heat is applied, a sufficient pretilt angle cannot be maintained, thus arising a possibility that domains will be generated undesirably.

As for the polarizing filter, the angle between the axis of the polarization of the polarizing filter and the axis of the alignment of the liquid crystal must be accurately matched to each other when the polarizing filter is disposed.

Furthermore, when the polarizing filter is disposed, mixture of foreign matters and generation of static electricity must be prevented carefully.

Therefore, when the polarizing filter is disposed, the foregoing severe requirements must be satisfied. Even if each liquid crystal display satisfies the foregoing requirements, scattering with respect to other liquid crystal displays frequently takes place. Thus, the manufacturing yield deteriorates.

The color filter can be usually manufactured by any of a printing method employing the principle of printing; a dying method using photolithography; a pigment dispersion method; and an electrolytic deposition method in which a dyestuff is electrochemically deposited.

Although the printing method exhibits a low cost and excellent mass productivity, its process of applying pressure to viscous ink to press a pattern results in deterioration in the accuracy at the ends of the pattern. Furthermore, deviation and rough surface cannot be prevented and therefore unsatisfactory pattern accuracy and flatness cannot be prevented as intrinsic problems.

The electrolytic deposition method is a method comprising the steps of dissolving or dispersing polymer resin, that contains dyestuffs dispersed therein, in a solvent; and electrochemically applying the thus-prepared solution to an electrode. Since the thickness of the film can be controlled by adjusting the voltage, the electrolytic deposition method exhibits excellent performance of controlling the film thickness. Furthermore, since thermosetting resin is used as the binder for the dyestuff, the foregoing method exhibits excellent heat resistance, light resistance and chemical resistance. In addition, since coloring is performed by immersion into an electrolytic deposition bath, an advantage can be obtained in that a large-scale color filter can be manufactured.

However, the electrolytic deposition method involves too many manufacturing processes that are complicated excessively. Thus, it has been considered that the cost cannot easily be reduced.

Accordingly, the color filters have been preferably manufactured by the dying method or the pigment dispersion method.

The dying method comprises the steps of: applying, onto a substrate, a material in which dichromic acid solution is added to a dyeable water solution of a polymer material, such as gelatin, casein, polyacrylamide or polyvinylalcohol, so that photosensitivity is given; exposing the substrate to UV light through a negative-type photomask; forming a pattern; and using any of a variety of dyes (an acidic dye or a reactive dye) to color the material.

Since the dying method employs the photolithography, it exhibits excellent pattern definition and accuracy, and therefore the color filters can be manufactured stably.

The pigment dispersion method comprises the steps of applying, to a substrate, a heat-resisting coating material or photosensitive resin, in which any of a variety of pigments for use to color a plastic material is uniformly dispersed; and exposing the substrate to UV light so that a colored pattern is formed. Since the foregoing method employs the photolithography, an excellent pattern accuracy can be realized similarly to the dying method. Furthermore, the pigment dispersion method has an advantage in that excellent heat resistance and light resistance can be realized.

However, the dying method and the pigment dispersion method, each of which has the step of appropriately mixing and adding the dye or the pigment into the resin serving as the base, inevitably encounters a limitation in the quantity of addition.

Therefore, dark colors requiring a large quantity of the dye or the pigment to be added have been displayed by increasing the quantity of the resin, that serves as the base, so as to thicken the resin layer.

However, the foregoing means encounters a fact that the influence of absorption of intrinsic light by the resin, that serves as the base, cannot be ignored. Thus, the displayed color becomes subdued or the quantity of transmitted light is reduced, thus causing a problem to arise in that the overall color tone to be darkened.

Since dark red, green and blue components intended to be displayed respectively require corresponding dyes or pigments in different quantities, pixels for the respective colors of the color filter have different thicknesses. As a result, there arises problems in that the performance of controlling the thickness of the liquid crystal layer deteriorates, display quality becomes unsatisfactory and satisfactory accuracy cannot be realized.

SUMMARY OF THE INVENTION

An object of the present invention is to overcome at least one of the foregoing problems.

According to the present invention, there is provided (1) a liquid crystal display having excellent-quality alignment layers having heat resistance, maintaining a sufficiently large pretilt angle, capable of preventing generation of domains and improving the reliability, a method of manufacturing the alignment layer, and a manufacturing apparatus therefor;

(2) a liquid crystal display having a polarizing filter enabling a simple manufacturing method that is capable of moderating requirements arising in the manufacturing process, and a method of manufacturing the polarizing filter; and (3) a liquid crystal display having a color filter, capable of reducing the thickness and realizing bright and clear dark color, and a method of manufacturing the color filter.

In order to achieve the foregoing objects, a liquid crystal display according to a first embodiment of the present invention comprises:

a pair of substrates disposed to face each other;

liquid crystal enclosed between the substrates;

a transparent electrode formed on either of the substrates;

an opposite electrode formed on the other substrate to face the transparent electrode;

alignment layers for holding the liquid crystals therebetween; and a polarizing filter formed on at least either of the pair of substrates, wherein the alignment layer has, on the surface of thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, and the alignment layer is made of a compound having main chains, that are stable with respect to UV light, and side chains, each of which has an aliphatic ringing group to which aromatic groups are bonded, and which cross-link between the main chains, wherein the aromatic groups are aligned substantially in the first direction.

A liquid crystal display according to a modification of the first embodiment is a liquid crystal display according to the first embodiment, wherein the alignment layer is made of a compound having a repetition structure unit expressed by the following chemical formula:

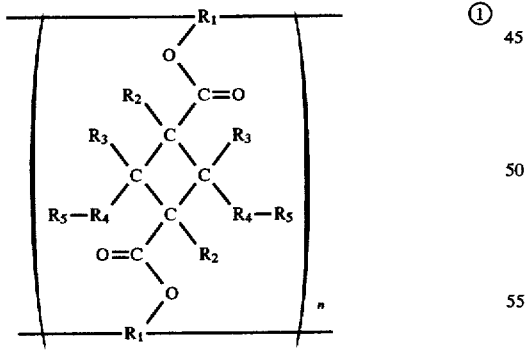

(1)

where $R_1$ is —$CH_2CH$ or selected from a group consisting of

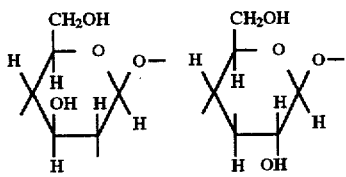

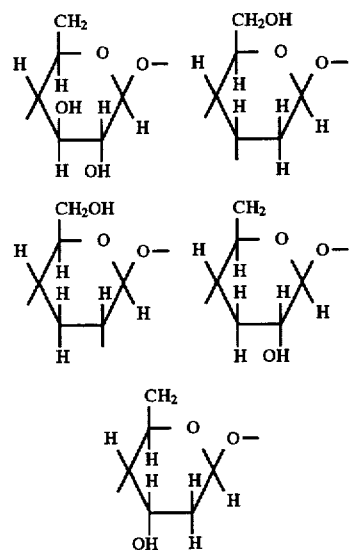

$R_2$ is —H, $R_3$ is —H, $R_4$ is —$C_6H_4$, and $R_5$ is selected from a group consisting of —H, $CH_3$, —$OCH_3$, —$C_2H_5$, —$OC_2H_5$, —$NO_2$, —$CN$ and —$C_6H_4CN$.

A first method of manufacturing a liquid crystal display according to the first embodiment is a method of manufacturing a liquid crystal display that has a pair of substrates disposed to face each other, liquid crystal enclosed between the substrates, a transparent electrode formed on either of the substrates, an opposite electrode formed on the other substrate to face the transparent electrode, alignment layers for holding the liquid crystals therebetween, and a polarizing filter formed on at least either of the pair of substrates, the method of manufacturing a liquid crystal display comprising the step of forming the alignment layer that has the steps of:

forming, on the substrate, a polymer resin film made of a compound having main chains, that are stable with respect to UV light, and side chains each having a functional group, which includes aromatic groups and multiple bonds that are capable of performing cross-linking reactions, and which absorbs light in the UV light region;

pressing, against the surface of the polymer resin film, a mold that has a pressing surface consisting of roof-like concave and convex rows, each of which is formed by repeatedly, in an arbitrary direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the arbitrary direction, are formed in a direction that is substantially perpendicular to the arbitrary direction so as to form, on the surface of the polymer resin film, concave and convex rows formed in a first direction and having a long repetition unit length and concave and convex rows formed in a second direction substantially perpendicular to the first direction and having a repetition unit length shorter than the repetition unit length of the concave and convex rows formed in the first direction; and irradiating the polymer resin film with UV light polarized in the second direction.

A method of manufacturing a liquid crystal display according to a first modification of the first method is a method of manufacturing a liquid crystal display according to the first method, wherein the compound for forming the polymer resin film to be formed on the substrate has a repetition structure unit expressed by the following chemical formula:

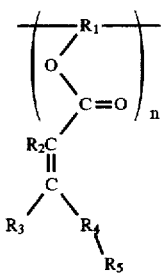

where $R_1$ is —$CH_2CH$ or selected from a group consisting of

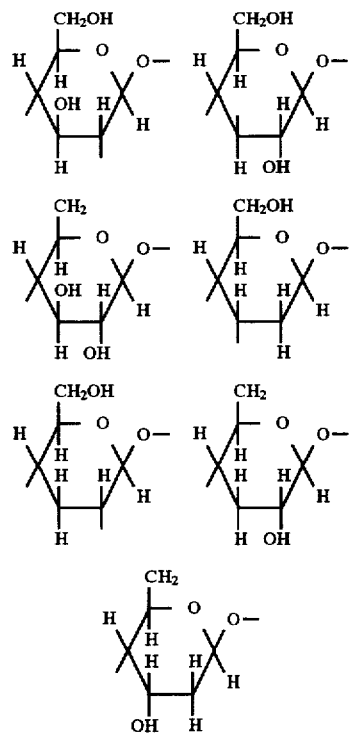

$R_2$ is —H, $R_3$ is —H, $R_4$ is —$C_6H_4$, and $R_5$ is selected from a group consisting of —H, $CH_3$, —$OCH_3$, —$C_2H_5$, —$OC_2H_5$, —$NO_2$, —CN and —$C_6H_4CN$.

According to a second modification of the first method of the present invention, there is provided an apparatus for manufacturing an alignment layer of a liquid crystal display comprising:

a holding mechanism for holding a substrate on which a polymer resin film is formed;

a stamping mechanism for pressing, against the surface of the polymer resin film, a mold having, thereon, a concave and convex pattern to be stamped to the polymer resin film; and a polarized-UV-light irradiation mechanism having a UV light source and a polarizer for polarizing UV light from the UV light source to irradiate the polymer resin film formed on the substrate with polarized UV light.

A liquid crystal display according to a second embodiment of the present invention comprises:

a pair of substrates disposed to face each other;

liquid crystal enclosed between the substrates;

a transparent electrode formed on either of the substrates;

an opposite electrode formed on the other substrate to face the transparent electrode;

alignment layers for holding the liquid crystals therebetween; and a polarizing filter formed on at least either of the pair of substrates, wherein the polarizing filter is made a compound, which has main chains, that are stable with respect to UV light, and side chains, each of which has an aliphatic ringing group to which aromatic groups are bonded, and which cross-link between the main chains, and in which a dying functional group capable of absorbing light in a wavelength corresponding to the overall visible ray region is bonded to the aliphatic ringing group, wherein the side chains are aligned in substantially a predetermined direction.

A second method of manufacturing a liquid crystal display according to the second embodiment that has a pair of substrates disposed to face each other, liquid crystal enclosed between the substrates, a transparent electrode formed on either of the substrates, an opposite electrode formed on the other substrate to face the transparent electrode, alignment layers for holding the liquid crystals therebetween, and a polarizing filter formed on at least either of the pair of substrates, the method of manufacturing a liquid crystal display comprising the step of forming the polarizing filter having the steps of forming, on the substrate, a polymer resin film made of a compound having main chains, that are stable with respect to UV light, and side chains each having a functional group, which includes a dying functional group for absorbing light having the wavelength corresponding to substantially the overall visible ray region and a multiple bond that is capable of performing cross-linking reactions, and which absorbs light in the UV light region;

moving, in a contact manner, an aligning member on the surface of the polymer resin film in a predetermined direction; and irradiating the polymer resin film with UV light polarized in a direction perpendicular to the direction in which the aligning member is moved.

A liquid crystal display according to a third embodiment of the present invention comprises:

a pair of substrates disposed to face each other; liquid crystal enclosed between the substrates;

a transparent electrode formed on either of the substrates;

an opposite electrode formed on the other substrate to face the transparent electrode;

alignment layers for holding the liquid crystals therebetween;

a polarizing filter formed on at least either of the pair of substrates; and a color filter formed on either or both of the substrates, wherein the color filter is made of a compound which has main chains, that are stable with respect to UV light, and side chains each of which has an aliphatic ringing group to which aromatic groups are bonded, and which cross-link between the main chains, wherein a dying functional group is bonded to the aliphatic ringing group.

A liquid crystal display according to a first modification of the third embodiment includes is a liquid crystal display according to the third embodiment, wherein the dying functional group is a dying functional group that passes light having the wavelength corresponding to any of green, blue or red.

A manufacturing method of manufacturing a liquid crystal display according to the third embodiment having a pair of substrates disposed to face each other, liquid crystal enclosed between the substrates, a polarizing filter formed on at least either of the pair of substrates, and a color filter formed on either or both of the substrates, the method of manufacturing a liquid crystal display comprising the step of forming the color filter having the steps of forming, on the substrate, a polymer resin film made of a compound having main chains, that are stable with respect to UV light, and side chains each having a functional group, which includes a dying functional group for absorbing light in a portion of the wavelength in the visible ray region and a multiple bond that is capable of performing cross-linking reactions, and which absorbs light in the UV light region, and irradiating the polymer resin film with UV light.

A manufacturing method according to a modification of the above method includes the method of manufacturing a liquid crystal display according to the above method, wherein the dying functional group is a dying functional group that passes light having the wavelength corresponding to any of green, blue or red.

A liquid crystal display according to according to a fourth embodiment of the present invention comprises:

a pair of substrates disposed to face each other;

liquid crystal enclosed between the substrates;

a transparent electrode formed on either of the substrates;

an opposite electrode formed on the other substrate to face the transparent electrode;

alignment layers for holding the liquid crystals therebetween; and a polarizing filter formed on at least either of the pair of substrates, wherein the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound having main chains, that are stable with respect to UV light, and side chains each of which has an aliphatic ringing group to which aromatic groups are bonded, and which cross-link between the main chains, the aromatic groups are aligned substantially in the first direction, and the polarizing filter is made of a compound in which a dying functional group for absorbing light having the wavelength corresponding to substantially the overall visible ray region or a dying functional group for absorbing light having the wavelength corresponding to a specific visible ray region is bonded to the aliphatic ringing group of the compound forming the alignment layer, and the side chains are aligned in a substantially predetermined direction.

A liquid crystal display according to according to a fifth embodiment of the present invention comprises:

a pair of substrates disposed to face each other; liquid crystal enclosed between the substrates;

a transparent electrode formed on either of the substrates;

an opposite electrode formed on the other substrate to face the transparent electrode;

alignment layers for holding the liquid crystals therebetween;

a polarizing filter formed on at least either of the pair of substrates; and a color filter formed on either or both of the substrates, wherein the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound having main chains, that are stable with respect to UV light, and side chains each of which has an aliphatic ringing group to which aromatic groups are bonded, and which cross-link between the main chains, wherein the aromatic groups are aligned substantially in the first direction, and the color filter is made of a compound in which a dying functional group for passing light in a portion of the wavelength of the visible ray region is bonded to the aliphatic ringing group of the compound forming the alignment layer.

A liquid crystal display according to according to a sixth embodiment of the present invention comprises:

a pair of substrates disposed to face each other;

liquid crystal enclosed between the substrates;

a transparent electrode formed on either of the substrates;

an opposite electrode formed on the other substrate to face the transparent electrode; and alignment layers for holding the liquid crystals therebetween, wherein the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound which comprises main chains, that are stable with respect to UV light, and side chains each of which has an aliphatic ringing group to which aromatic groups are bonded, and which cross-link between the main chains, and in which a dying functional group for absorbing light having the wavelength corresponding to substantially the overall visible ray region is bonded to the aliphatic ringing group, and the aromatic groups and the side chains are aligned substantially in the first direction.

A liquid crystal display according to according to a seventh embodiment of the present invention comprises:

a pair of substrates disposed to face each other; liquid crystal enclosed between the substrates;

a transparent electrode formed on either of the substrates;

an opposite electrode formed on the other substrate to face the transparent electrode;

alignment layers for holding the liquid crystals therebetween; and a polarizing filter formed on at least either of the pair of substrates, wherein the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound which comprises main chains, that are stable with respect to UV light, and side chains each of which has an aliphatic ringing group to which aromatic groups are bonded, and which cross-link between the main chains, and in which a dying functional group for absorbing light in a portion of the wavelength of the visible ray region is bonded to the aliphatic ringing group, and the aromatic groups are aligned substantially in the first direction.

A liquid crystal display according to according to an eighth embodiment of the present invention comprises:

a pair of substrates disposed to face each other; liquid crystal enclosed between the substrates;

a transparent electrode formed on either of the substrates;

an opposite electrode formed on the other substrate to face the transparent electrode; and alignment layers for holding the liquid crystals therebetween, wherein the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound which comprises main chains, that are stable with respect to UV light, and side chains each of which has an aliphatic ringing group to which aromatic groups are bonded, and which cross-link between the main chains, and in which a dying functional group for absorbing light in a portion of the wavelength of the visible ray region is bonded to the aliphatic ringing group, and the aromatic groups and the side chains are aligned substantially in the first direction.

The alignment layer of the liquid crystal display according to the first method is composed of the foregoing specific polymer compound having the structure such that the aromatic groups bonded to the aliphatic ringing group of the side chains cross-linking the main chains are aligned in a predetermined direction. Therefore, although the alignment layer is formed by the stamping method, the force for maintaining the shape of the concave and convex pattern of the alignment layer is satisfactorily large. Thus, a sufficiently large pretilt angle can be maintained, and Generation of domains can be prevented.

Since the force of maintaining the shape of the concave and convex pattern of the alignment layer is satisfactorily large, disorder of the shape of the concave and convex pattern can be prevented satisfactorily and irregularity in the display frame of the liquid crystal display cannot easily take place.

Furthermore, excellent vibration resistance and heat resistance are obtained, and thus the reliability of the liquid crystal display can be improved.

It is preferable that the material for forming the alignment layer be the compound having the repetition structure unit expressed by the foregoing chemical formula ①.

The method of manufacturing the alignment layer of the liquid crystal display claimed in the first method of the present invention comprises the steps of forming the film made of the specific polymer compound on the substrate; stamping the concave and convex pattern by the stamping method; and applying polarized UV light. Thus, the hardening reactions with UV light can be limited as desired so that anisotropy is generated in the cross-linked molecules in the hardened alignment layer. As a result, the anchoring strength with respect to the liquid crystal is enlarged so that the pretilt angle is enlarged and the vibration resistance and heat resistance are improved.

It is preferable that the polymer resin film for manufacturing the alignment layer be a material having the repetition structure unit expressed by the foregoing chemical formula ②.

The apparatus for manufacturing the alignment layer of the liquid crystal display according to the second modification of the first method of the present invention is a most suitable apparatus to embody the method of manufacturing the alignment layer according to the present invention. An alignment layer having a large pretilt angle and exhibiting excellent vibration resistance and heat resistance can be formed. Furthermore, generation of domains can be prevented.

The polarizing filter of the liquid crystal display according to the second embodiment of the present invention is manufactured by the manufacturing method according to the second method. The foregoing method causes the specific polymer resin film to be irradiated with UV light polarized into a predetermined direction so that a polarizing function is given to the polymer resin film to have a polarizing axis corresponding to the polarizing direction of UV light.

Therefore, when the polarizing filter is formed on the liquid crystal display, the polarizing direction of UV light to be applied is simply required to be adjusted with respect to the angle of the alignment axis of the liquid crystals. Thus, the conventional difficulty to perform accurate matching arising at the time of forming the polarizing filter can be prevented.

Furthermore, the liquid crystal displays can be manufactured in an in-line and non-contact manner in a clean room exhibiting excellent cleanliness, mixture of foreign matters and generation of static electricity can be prevented.

Since the polarizing function is given by applying predetermined and polarized UV light, repeated manufacturing of polarizing filters with respect to a plurality of pixels can easily be performed.

The color filter according to the third embodiment has the structure that chemical reactions realized by bonding the dying functional group as the substituent of the compound are used to color the color filter in place of adding a dye or a pigment. The adjustment of the density of each color is not performed by an additive, such as a dye or a pigment. Therefore, a necessity of increasing the thickness of the resin forming the base to attain a dark color does not arise easily. Therefore, a thin-film color filter is able to realize a clear and sufficient dark color.

Even if the color is changed, the color filter can be formed thinly without a necessity of changing the thickness of the color filter. Therefore, the controllability of the gap in the liquid crystals can be improved.

At this time, dying functional groups that pass light having the wavelength that is a portion of the visible ray region are employed. It is preferable that the dying functional groups pass light having the wavelengths that correspond to desired colors, such as, a dying functional group that passes light having the wavelength that corresponds to red, a dying functional group that passes light having the wavelength that corresponds to green, and a dying functional group that passes light having the wavelength that corresponds to blue.

The color filter of the liquid crystal display can easily be manufactured by a method comprising the steps of: forming, on a substrate, a polymer resin film composed of a compound having main chains, each of which is composed of a saturated or an unsaturated aliphatic group, and side chains having a functional group, which includes a dying functional group that passes light having the wavelength which is a portion of the visible ray region and a multiple bond that is capable of performing cross-linking reactions, and which absorbs light in the UV light region; and irradiating the polymer resin film with UV light so that dying functional groups in a sufficient quantity are introduced.

As the dying functional group to be used in the polymer resin film, dying functional groups that pass light having the wavelength that is a portion of the visible ray region are employed. It is preferable that the dying functional groups pass light having the wavelengths that correspond to desired colors, such as, a dying functional group that passes light having the wavelength that corresponds to red, a dying functional group that passes light having the wavelength that corresponds to green, and a dying functional group that passes light having the wavelength that corresponds to blue.

The liquid crystal display according to the fourth embodiment of the present invention comprises the polarizing filter that is made of the compound in which the dying functional group is introduced into the compound for forming the alignment layer. Thus, the alignment layer and the polarizing filter can be made by substantially the same type compound.

Therefore, another material is not required and thus the cost of the material can significantly be reduced.

If the dying functional group that is introduced absorbs light having the wavelength corresponding to a specific visible ray region (for example, the wavelength that corresponds to blue, the wavelength that corresponds to red, the wavelength that corresponds to green, and the like), also a roll as a color filter can be performed, and thus it can be used as a polarizing color filter.

The liquid crystal display according to the fifth embodiment of the present invention comprises the color filter that may be made of the compound in which the dying functional group is introduced into the compound that is used to form the alignment layer. Thus, the alignment layer and the color filter can be made of substantially the same type compound. Therefore, another material is not required and thus the cost of the material can significantly be reduced.

The liquid crystal display according to the sixth embodiment of the present invention comprises the alignment layer that is made of the specific compound in which the dying functional groups are bonded that absorb light having the wavelength corresponding to the substantially all visible ray region; and the side chains and aromatic groups of the compounds are aligned in the first direction.

Since the polarizing function is provided for the alignment layer in the foregoing case, light beams are made to be polarized beams when the beams are allowed to pass through the alignment layer. Thus, the necessity of providing a polarizing filter individually from the alignment layer can be eliminated.

The liquid crystal display having the structure, in which the alignment layer and the polarizing filter are formed by a common member, enables the cost of the material to be reduced because the independent polarizing filter can be omitted. Furthermore, the manufacturing processes cab be decreased and thus the manufacturing cost can significantly be reduced. Since the thickness of the liquid crystal display can be reduced, a further light weight and small size flat display can be realized.

The liquid crystal display according to the seventh embodiment of the present invention comprises the alignment layer made of the specific compound, in which the dying functional group is bonded. In this case, a liquid crystal display, in which a color alignment layer is applied to each pixel, is realized. Therefore, light beams are made to be polarized beams when the beams are allowed to pass through the alignment layer. Thus, the necessity of providing a color filter individually from the alignment layer can be eliminated when a color liquid crystal display is formed.

The liquid crystal display having the structure, in which the alignment layer and the color filter are formed by a common member, enables the cost of the material to be reduced because the independent color filter can be omitted. Furthermore, the manufacturing processes can be decreased and thus the manufacturing cost can significantly be reduced. Since the thickness of the liquid crystal display can be reduced, a further light weight and small size flat display can be realized.

The liquid crystal display according to the eighth embodiment of the present invention has the structure that the alignment layer is made of the specific compound to which the dying functional group is bonded, and the side chains and aromatic groups of the compound are aligned in the first direction.

In the foregoing case, the alignment layer is given the polarizing function so that light beams are made to be polarized beams when they are allowed to pass through the alignment layer. Therefore, the necessity of providing a polarizing filter individually from the alignment layer can be eliminated. Furthermore, a liquid crystal display, in which the colored alignment layer is applied to each pixel, is realized so that light beams are made to be colored light beams when they are allowed to pass through the alignment layer. As a result, the necessity of providing a color filter individually from the alignment layer can be eliminated when a color liquid crystal display is formed.

The liquid crystal display having the structure, in which the polarizing filter and the color filter are formed by a common member, enables the cost of the material to be reduced because the independent polarizing filter and the color filter can be omitted. Furthermore, the manufacturing processes can be decreased and thus the manufacturing cost can significantly be reduced. Since the thickness of the liquid crystal display can be reduced, a further light weight and small size flat display can be realized.

Other and further objects, features and advantages of the invention will be appear more fully from the following description.

DESCRIPTION OF THE PREFERRED EMBODIMENTS

Preferred embodiments of the present invention will now be described. It is understood that the present invention is not limited to the embodiments below.
First Embodiment A liquid crystal display according to the present invention is mounted on any of a variety of liquid crystal display apparatuses. For example, the present invention is applied to a liquid crystal display of a type shown in FIG. 11.

Figure 11:
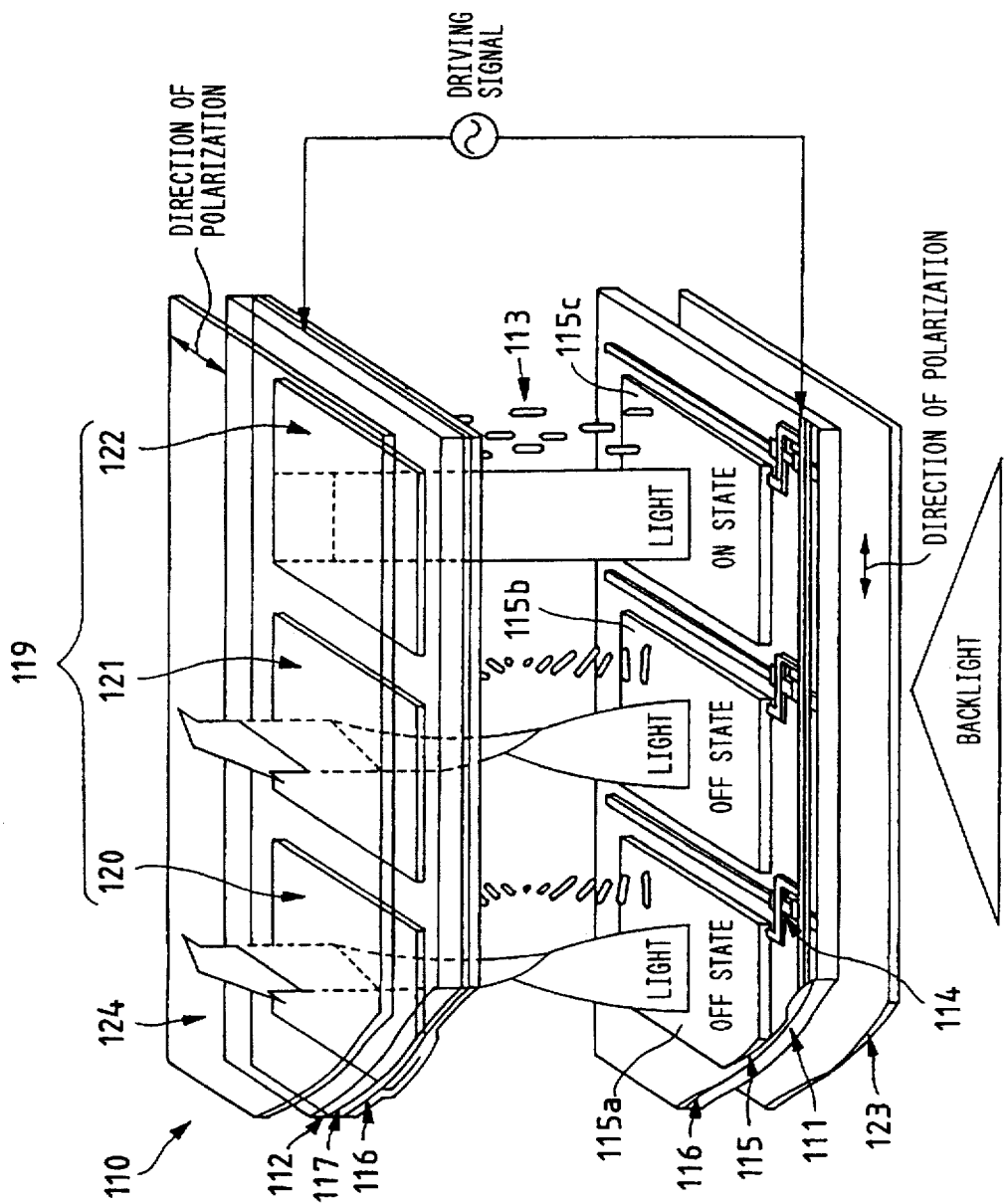
FIG. 11 is a perspective view showing an example of a liquid crystal display.

A color liquid crystal display 110 shown in FIG. 11 comprises a pair of substrates 111 and 112 disposed to face each other; liquid crystals 113 enclosed between the substrate 111 and the substrate 112; liquid crystal drive devices 114 formed on the substrate 111; transparent electrodes 115 (115a, 115b and 115c) connected to the liquid crystal drive devices 114; an opposite electrode 117 formed on the other substrate 112 to face the transparent electrodes 115; alignment layers 116 for holding the liquid crystals 113 therebetween; polarizing filters (a lower polarizing filter 123 and an upper polarizing filter 124) respectively formed on the pair of the substrates 111 and 112; and color filters 119 (120, 121 and 122) formed on the substrate 112.

As the substrates 111 and 112, those employed in a usual liquid crystal display may be employed that are exemplified by any of a variety of substrates, such as glass substrates or ceramic substrates. The shape of each of the substrates 111 and 112 is determined arbitrarily to be adaptable to the liquid crystal display intended to be obtained as the product, for example, a rectangular planar shape.

The liquid crystals 113 change the state of alignment of the molecules thereof when voltage is applied to the same. In the TN liquid crystal taken as an example shown in FIG. 11, rows of molecules twisted by 90° in a state where no voltage is applied are stood erect and twisting is suspended when voltage is applied to the same. A spacer in the form of particles (not shown in FIG. 11) is disposed between the two alignment layers 116, the spacer maintaining the gap, in which the liquid crystals 113 are enclosed, at a predetermined distance.

The liquid crystal drive devices 114 comprise thin film transistors (TFTs) or the like that transmit drive signals to control the voltage to be applied to the liquid crystals 113.

The transparent electrodes 115 and the opposite electrode 117, formed on the other substrate 112, form pairs so as to apply, to the liquid crystals 113, the voltage supplied from the liquid crystal drive devices 114, the transparent electrodes 115 usually comprising ITO films (indium-tin oxide films).

Although the liquid crystal drive devices 114 and the transparent electrodes 115 (115a, 115b and 115c) are provided for respective pixels, the opposite electrode 117 is usually formed into one electrode that is common to all pixels.

The polarizing filters 123 and 124 are films having a function for emitting linear polarization. In the illustrated liquid crystal display 110, the lower filter 123 and the upper filter 124 are so formed on the corresponding substrates 111 and 112 that their polarizing directions are different from each other by 90°.

The color filter 119 is employed in a color liquid crystal display and is usually formed into a set that consists of a red color filter, a green color filter and a blue color filter that are provided for each pixel. Thus, the color liquid crystal display uses combination of the foregoing three colors to express a variety of colors.

In the color liquid crystal display shown in FIG. 11, initially, light beams are, as back light, allowed to pass through the lower polarizing filter 123 from a position below the polarizing filter 123. At this time, only the light beams, that have been polarized in the horizontal direction when viewed in FIG. 11, are allowed to pass through the lower polarizing filter 123.

In the example shown in FIG. 11, the liquid crystal drive devices 114 perform control so that no electric current flows through the transparent electrodes 115a and 115b but only liquid crystals existing on the transparent electrode 115c are applied with voltage, as illustrated.

In the foregoing state, the polarized light beams are allowed to pass through the lower polarizing filter 123 followed by being allowed to pass through the glass substrate 111 and the alignment layers 116. Then, the direction of polarization of only the polarized light beams along the twisted liquid crystal molecules on the transparent electrodes 115a and 115b is converted, followed by being allowed to pass through the upper polarizing filter 124.

By disposing the color filter 120 that passes only red components, the color filter 121 that passes only green components and the color filter 122 that passes only blue component to face the respective transparent electrodes 115a, 115b and 115c, blue light beams are not allowed to pass to a position above the upper polarizing filter 124, whereas only red light beams and green light beams are allowed to pass through. As a result, a yellow image is displayed.

The alignment layer according to this embodiment will now be described with reference to FIG. 1.

Figure 1:
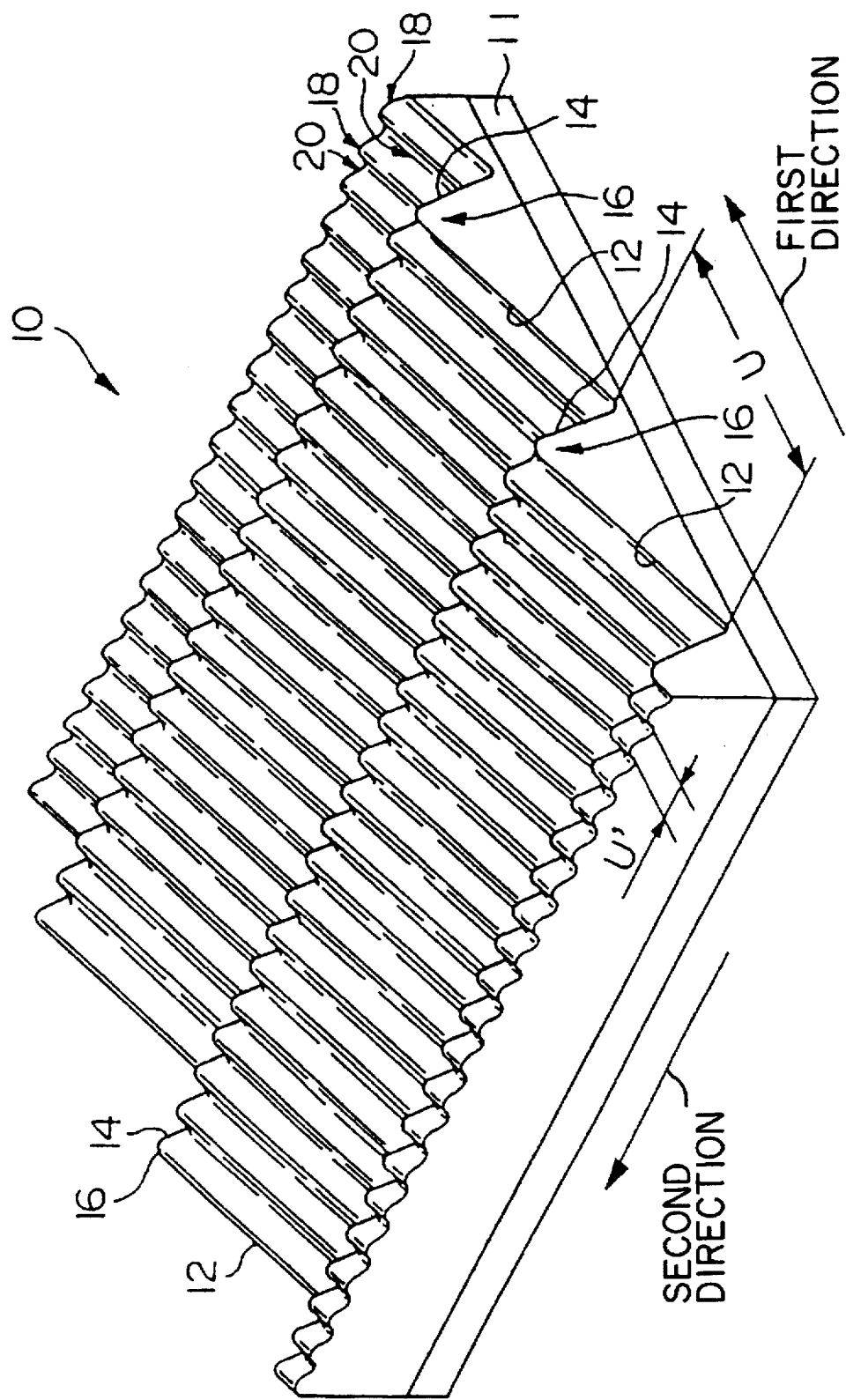
FIG. 1 is a perspective view showing an example of an alignment layer according to the present invention.

An alignment layer 10 (116) formed on a substrate 11, shown in FIG. 1, has, on the surface thereof, a plurality of roof-like concave and convex rows 18, each of which is formed by repeatedly, in a first direction, forming convex portions 16 each of which consists of a longer side portion 12 and a shorter side portion 14.

Between the roof-like concave and convex rows 18, there are, also in the first direction, formed a plurality of valley-like concave and convex rows 20 having a similar shape to that of the roof-like concave and convex rows 18 but lower than the same.

Since the roof-like concave and convex rows 18 and the valley-like concave and convex rows 20 having the different heights are adjacently and alternately formed, concaves and convexes having unit length U', that is shorter than unit length U of repetition of the concaves and convexes formed in the first direction, are formed in a second direction substantially perpendicular to the first direction.

It is preferable that the unit length U of repetition of the concaves and convexes formed in the first direction be 50 μm or shorter and the unit length U' of repetition in the second direction be 3 μm or shorter, more preferably the repetition unit length U be 20 μm or shorter and the repetition unit length U' be 1.2 μm or shorter.

Figure 2:
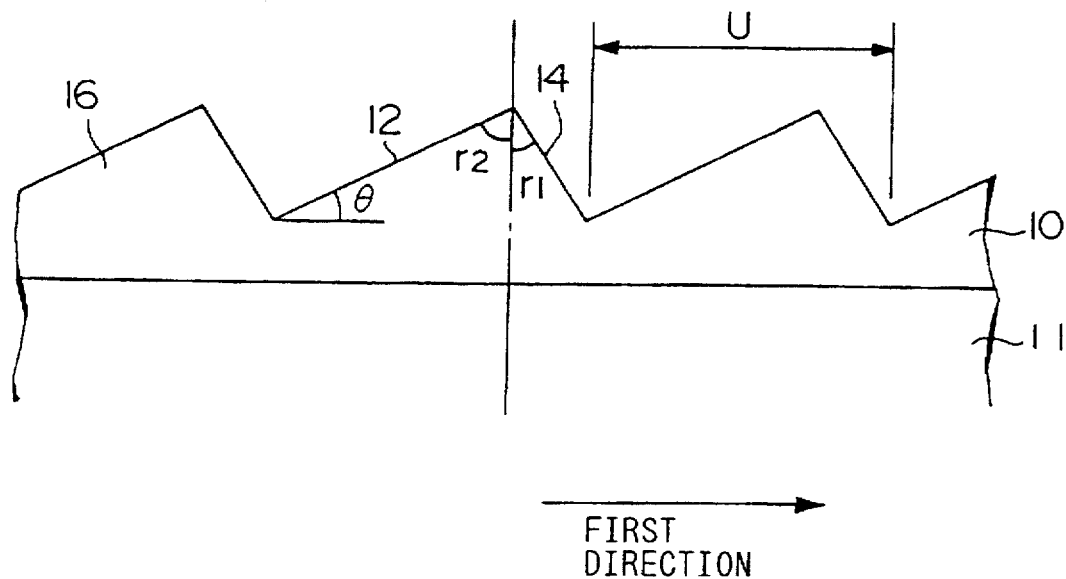
FIG. 2 is a partial side view showing concave and convex rows.

Furthermore, it is preferable that the inclination angle θ of the edge line of the longer side portion 12 be 1° or larger, as shown in FIG. 2.

Each convex portion 16 of the concaves and convexes in the first direction is formed into a substantially triangular shape having two asymmetric sides, as shown in FIG. 2.

That is, the shape is so determined that the ratio $r_2/r_1$ of the right and left portions of the apex angle divided by a perpendicular downwards drawn from the apex of the convex portion 16 is not 1. The shape of the convex portion 16 may be any of a variety of shapes exemplified by a shape like a sine wave, a wedge-like shape and a triangular shape. If the convex portion 16 is formed into the triangular shape, the apex may be rounded or cut into a flat shape. If the convex portion 16 is formed into the triangular shape, it is preferable that the ratio $r_2/r_1$ of the right and left portions of the apex angle divided by a perpendicular downwards drawn from the apex of the convex portion 16 be 1.2 or larger.

In this embodiment, the material of the alignment layer comprises: main chains that are stable with respect to UV light; and side chains each having an aliphatic ringing group, to which aromatic groups are bonded, and cross-linking between the main chains, the aromatic groups being substantially aligned in the first direction.

Figure 3:
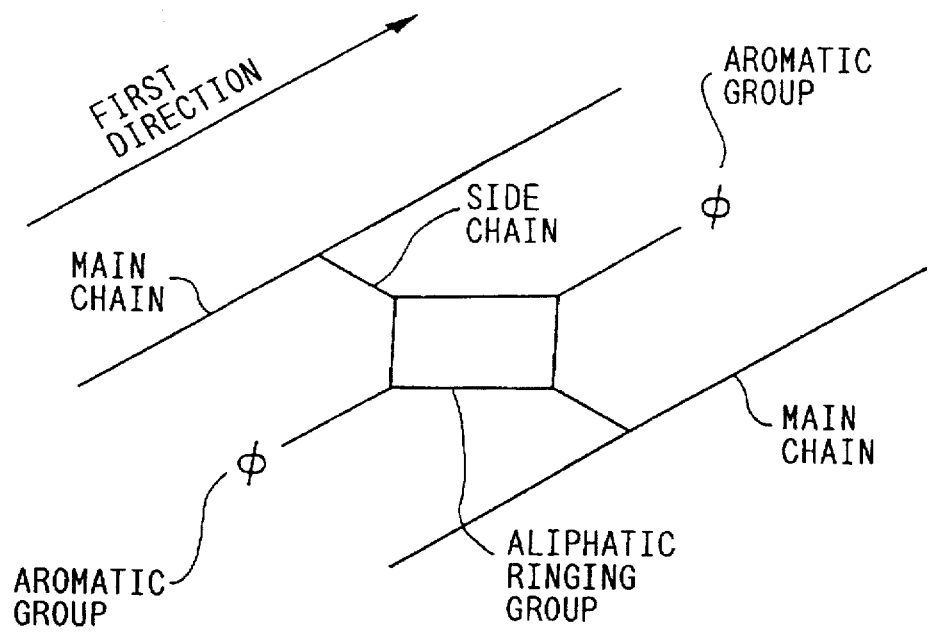
FIG. 3 is a schematic view showing a polymer compound forming the alignment layer.

That is, as shown in FIG. 3, the aliphatic ringing group is disposed between the side chains that cross-linking between the main chains, and the aromatic groups aligned in the first direction of the alignment layer are bonded to the aliphatic ringing group.

As a material that satisfies the foregoing conditions, it is preferable that a material expressed by the following chemical formula ① be employed:

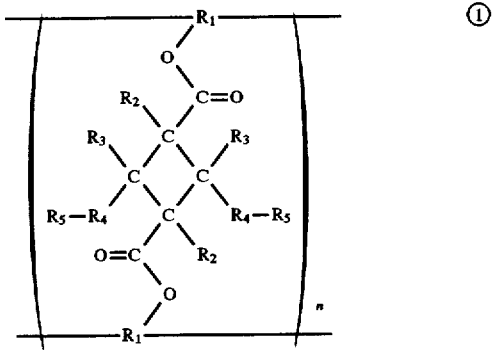

where $R_1$ is —$CH_2CH$ or any of materials selected from a group consisting of:

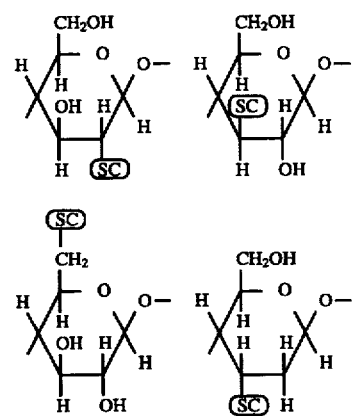

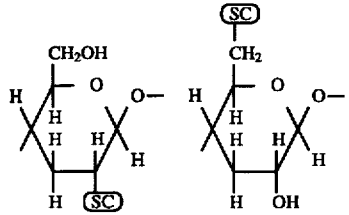

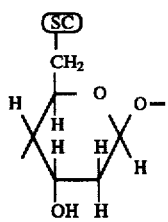

$R_2$ is —H, $R_3$ is —H, $R_4$ is —$C_6H_4$, $R_5$ is a material selected from a group consisting of —H, $CH_3$, —$OCH_3$, —$C_2H_5$, —$OC_2H_5$, —$NO_2$, —CN and —$C_6H_4CN$.

In each chemical formula expressing $R_1$, "SC" indicates the position at which the side chains are bonded.

The first direction of the alignment layer formed on either substrate and the first direction of the alignment layer formed on the other substrate are made to be perpendicular to each other. Namely, the second direction of the alignment layer on either substrate and the first direction of the alignment layer on the other substrate are made to be in parallel to each other.

The alignment layer 10 is manufactured in such a manner that a spin coating method, a screen printing method or an offset printing method is employed to apply polymer resin solution according to the present invention to the top surface of the substrate 11, on which the alignment layer will be formed; and the solution is dried by a baking process as the need arises so that the polymer resin film is formed.

The polymer resin film may be then subjected to prebaking and baking, as the need arises. The prebaking process and the baking process may be performed in such a manner that the substrate 11 is heated at 80° C. for about 30 seconds, followed by heating the same at about 180° C. for one hour. The substrate 11 may be previously heated to about 80° C., followed by performing screen printing, applying resin solution and performing baking.

The resin solution may be applied by the screen printing method in such a manner that a printing stage is, on a screen placed on the substrate 11, moved at a predetermined speed, for example, 10 cm/second, in the lengthwise, shorter side or the diagonal direction of the substrate 11.

It is preferable that the thickness of the polymer resin film formed by applying the polymer compound according to the present invention be about 0.1 μm.

In the present invention, the polymer resin to be applied to and formed on the substrate comprises a compound which contains: main chains that are stable with respect to UV light; and side chains each containing an aromatic ring and a multiple bond, that is capable of performing cross-linking reaction, and each having a functional group that absorbs light beams in the UV light region.

It is preferable that a polymer compound expressed by the following chemical formula ② be employed.

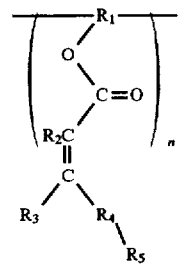

where $R_1$ is —$CH_2CH$ or a material selected from a group consisting.

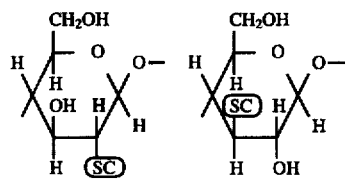

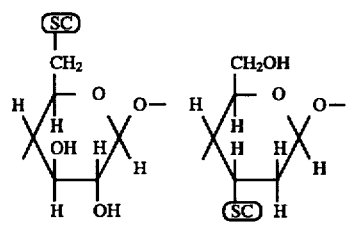

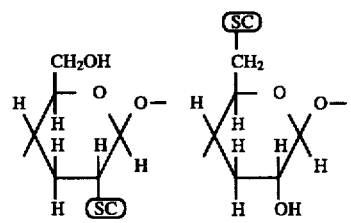

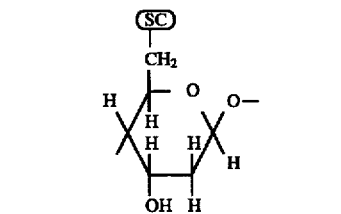

$R_2$ is —H, $R_3$ is —H, $R_4$ is —$C_6H_4$, $R_5$ is selected from a group consisting of —H, $CH_3$, —$OCH_3$, —$C_2H_5$, —$OC_2H_5$, —$NO_2$, —CN and —$C_6H_4CN$.

Then, the substrate is heated, and a mold having the concave and convex pattern to be stamped is pressed against the top surface of the polymer resin film so that the concave and convex pattern formed on the stamping surface of the mold is stamped on the polymer resin film. Then, the polymer resin film having the concave and convex pattern formed on the surface thereof is irradiated with polarized UV light to harden the polymer resin film so that the alignment layer is formed.

Figure 4:
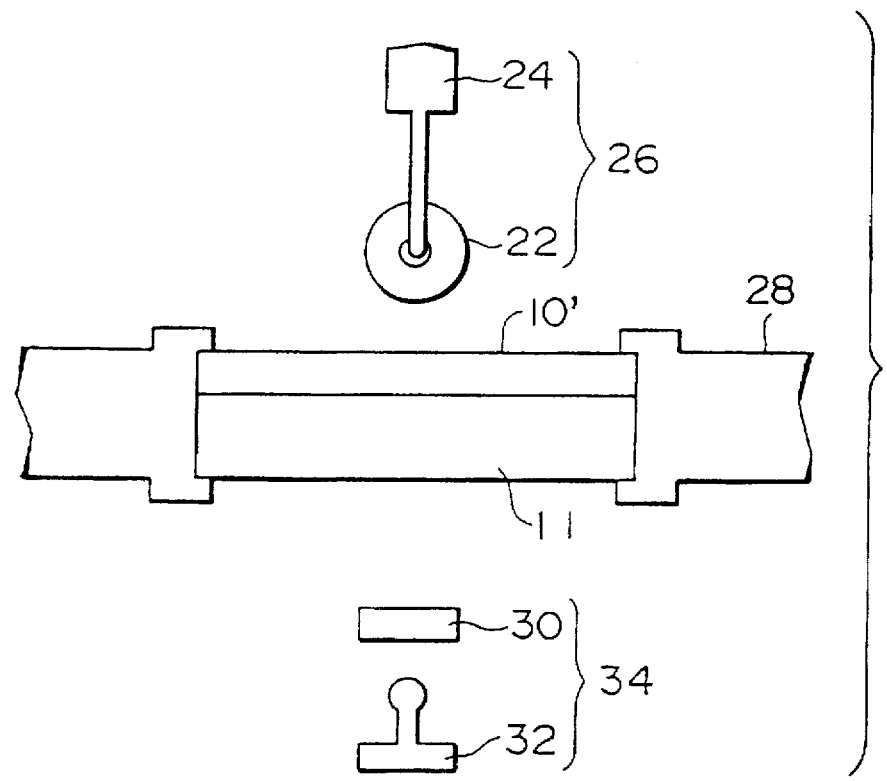
FIG. 4 is a schematic side view showing a method of manufacturing the alignment layer.

The alignment layer is formed by using, for example, a manufacturing apparatus structured as shown in FIG. 4. The manufacturing apparatus shown in FIG. 4 comprises a holding mechanism 28 for holding a substrate 11, on which a polymer resin 10' has been formed; a stamping mechanism 26 for pressing, against the surface of the polymer resin 10', a mold 22 having a concave and convex pattern to be stamped on the polymer resin film 10' formed on the surface thereof; and a polarized-UV-light irradiation mechanism 34 for irradiating, with polarized UV light, the polymer resin film 10' formed on the substrate.

The mold 22 of the stamping mechanism 26 is formed into a roller having the concave and convex pattern formed on the surface thereof. A drive unit 24 for pressing the mold 22 against the polymer resin film 10' is connected to the mold 22.

The polarized-UV-light irradiation mechanism 34 comprises a UV light source 32 for emitting UV light; and a polarizer 30 for polarizing UV light emitted by the UV light source 32 so as to irradiate the polymer resin film 10' with polarized UV light.

At this time, the direction, in which polarized UV light is polarized, is made to be in the direction of the concaves and convexes having the shorter repetition unit (that is, in the second direction) of the concave and convex pattern formed on the polymer resin film.

As a result, in the compound forming the polymer resin film, the side chains absorb UV light and performs crosslinking reactions so that aliphatic ringing groups are formed. Furthermore, the aromatic groups bonded to the aliphatic ringing groups are aligned in the first direction of the polymer resin film so as to be hardened.

The irradiation with UV light may be performed simultaneously with performing the stamping operation.

As a result of the foregoing operation, a multiplicity of convex portions are formed on the surface of the polymer resin film, whereby omitting the rubbing process using a rubbing cloth as has been performed with the conventional technology and enabling the dust generative process to be eliminated. Therefore, the manufacturing yield can be improved, and an arbitrary surface shape corresponding to the surface shape of the mold can accurately be given to the surface of the alignment layer.

The polymer resin according to the present invention is employed to form the polymer resin film and polarized UV light is applied to the same so that the concave and convex shape formed on the surface of the alignment layer is hardened and therefore the anchoring strength of the liquid crystal can be intensified. In particular, the vibration resistance and heat resistance can be improved so that reliability against external force and heat is improved.

First Modification of Manufacturing Apparatus

Figure 5:
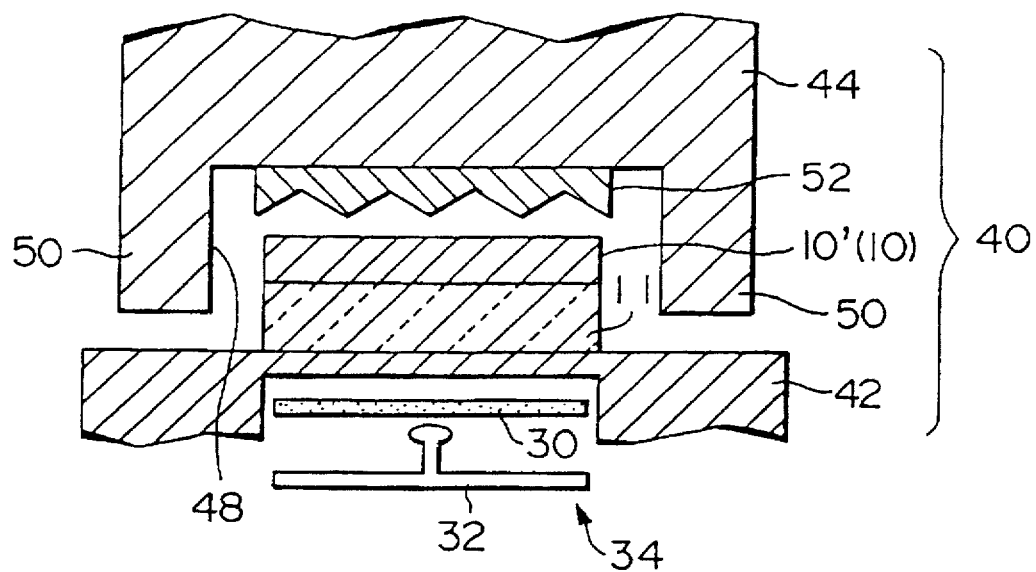
FIG. 5 is a side view showing an example of an apparatus for manufacturing the alignment layer.

As the manufacturing apparatus for forming the concave and convex pattern on the alignment layer, another apparatus shown in FIG. 5 may be employed.

A manufacturing apparatus 40 shown in FIG. 5 comprises a frame 42 serving as a mechanism for holding the substrate 11; an upper plate 44 serving as a stamping mechanism disposed above the frame 42 so as to be movable vertically; and the UV light irradiation mechanism 34.

The frame 42 is used to place the substrate 11. The substrate 11 placed on the frame 42 has, on the top surface thereof, a flat and smooth polymer resin film 10' on which the concave and convex pattern has not been formed.

The upper plate 44, serving as the stamping mechanism, is moved vertically by a moving mechanism (not shown) to press the polymer resin film 10', the upper plate 44 having a convex portion 48 in the lower surface thereof. A mold 52 is attached into the convex portion 48. A projecting stopper 50 is formed around the convex portion 48, the stopper 50 being brought into contact with the top surface of the frame 42 so as to prevent downward movement of the upper plate 44. Note that the mold 52 has, on the lower surface thereof, the concave and convex pattern to be stamped on the top surface of the alignment layer 10.

The polarized-UV-light irradiation mechanism 34 comprises a UV light source 32 for emitting UV light; and a polarizer 30 for polarizing UV light emitted by the UV light source 32 so that the polymer resin film 10' is irradiated with polarized UV light.

To manufacture the alignment layer by using the manufacturing apparatus 40, initially the substrate 11 having the polymer resin film 10' comprising the compound according to the present invention is placed on the frame 42. Then, the upper plate 44 is moved downwards so that the mold 52 is pressed against the top surface of the polymer resin film 10'. As a result, the concave and convex pattern on the lower surface of the mold 52 is stamped to the top surface of the polymer resin film 10'. Thus, an alignment layer 10 having the concave and convex pattern formed as shown in FIG. 1 can be obtained.

Then, the direction of polarization is made to be in the direction of the concaves and convexes having the longer repetition unit (that is, in the first direction) of the concave and convex pattern formed on the polymer resin film by the polarized-UV-light irradiation mechanism 34 that emits polarized UV light so that the polymer resin film 10' is hardened.

When the stopper 50 of the upper plate 44 has been brought into contact with the top surface of the frame 42, the downward movement of the upper plate 44 is stopped so that the introduction of the mold 52 into the polymer resin film 10' is inhibited. As a result, the concave and convex pattern having a predetermined depth is formed on the top surface of the polymer resin film 10'.

Second Modification of Manufacturing Apparatus

Figure 6:
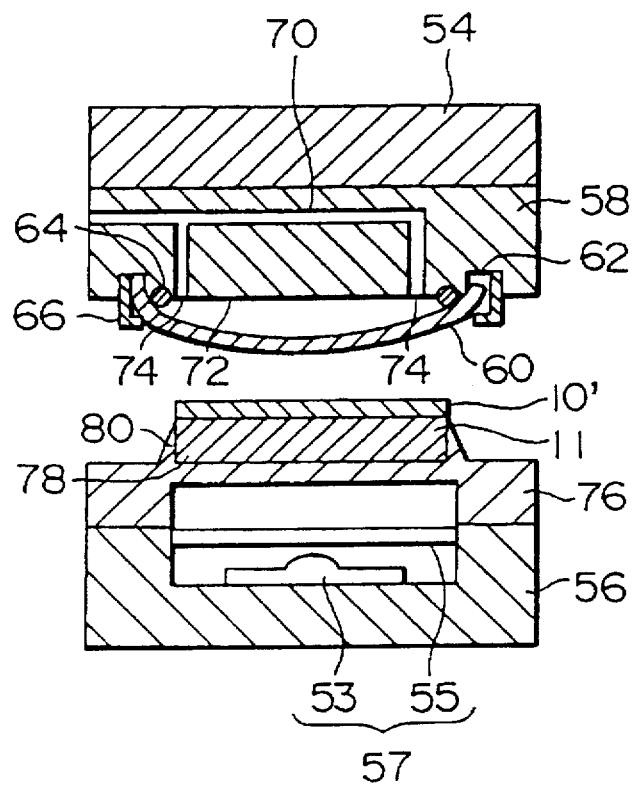
FIG. 6 is a side view showing an example of an apparatus for manufacturing the alignment layer.

Another manufacturing apparatus shown in FIG. 6 may be employed.

FIG. 6 shows an example of an apparatus for manufacturing the alignment layer, wherein reference numeral 54 represents an upper plate serving as a stamping mechanism, and 56 represents a lower plate serving as a holding mechanism. Each of the foregoing plates 54 and 56 have a heating mechanism and a cooling mechanism so as to heat or cool the plates at a predetermined timing.

The upper plate 54 has a surface plate 58 attached to the lower surface thereof, the surface plate 58 having, on the lower surface thereof, a mold 60 having a concave and convex pattern. The surface plate 58 has a relieving groove 62 in the outer periphery of the lower surface thereof. A packing 64 is attached to the inner surface of the opening portion of the relieving groove 62. L-shape metal retainers 66 are received within the outer surface of the relieving groove 62. The packing 64 and the metal retainers 66 form a mold warping mechanism.

The surface plate 58 has an air supply passage 70 for supplying compressed air. The air supply passage 70 has two openings formed in the lower surface 72 of the surface plate 58. The openings 74 are formed at positions more adjacent to the center of the surface plate 58 than the position of the packing 64.

A release valve (not shown), that is opened when pressure of a predetermined level is applied, is connected to the air supply passage 70. The release valve is arranged to be opened at a pressure level that is somewhat lower than the pressure required to stamp the concave and convex pattern of the mold 60 on to the polymer resin film 10' The lower surface 72 of the surface plate 58 is finished into an accurate flat plane.

The mold 60 has, on the lower surface thereof, the concave and convex pattern that corresponds to the concave and convex pattern to be formed on the surface of the alignment layer. The mold 60 is made of a thin metal plate that can be elastically deformed, the mold 60 having a width that is larger than the distance between the metal retainers 66. The outer periphery of the mold 60 is inserted between the packing 64 and the metal retainer 66. The edge of the mold 60 and the bottom of the relieving groove 62 of the surface plate 58 are apart from each other.

A surface plate 76 is disposed on the upper surface of the lower plate 56. The surface plate 76 has an upper surface 78 provided with a projection 80 in the central portion thereof, the projection 80 being used to locate the glass substrate 11 that has the polymer resin film 10' formed thereon.

Furthermore, the lower plate 56 includes a polarized-UV-light irradiation mechanism 57 that comprises a UV source 53 and a polarizer 55. The surface plate 76 disposed above the polarized-UV-light irradiation mechanism 57 is made of a rigid material, such as hard glass, through which UV light is transmitted. Thus, polarized UV light emitted by the polarized-UV-light irradiation mechanism 57 reaches the polymer resin film 10'.

The method of stamping the concave and convex pattern by using the foregoing apparatus for manufacturing an alignment layer will now be described. The foregoing stamping method comprises the steps of previously heating the upper plate 54 and the lower plate 56; and, in this state, setting the subject of stamping to the lower plate 56, as shown in FIG. 6. On the other hand, compressed air under a predetermined pressure is supplied to the air supply passage 70 of the upper plate 54 so as to downwards warp the mold 60 into a circular arc shape. As a result, the mold 60 is brought into a state where its central portion projects.

When the upper plate 54 is moved downwards in the foregoing state, the central portion of the mold 60, that projects to the lowermost position, is linearly brought into contact with the polymer resin film 10' of the subject of stamping.

Figure 7:
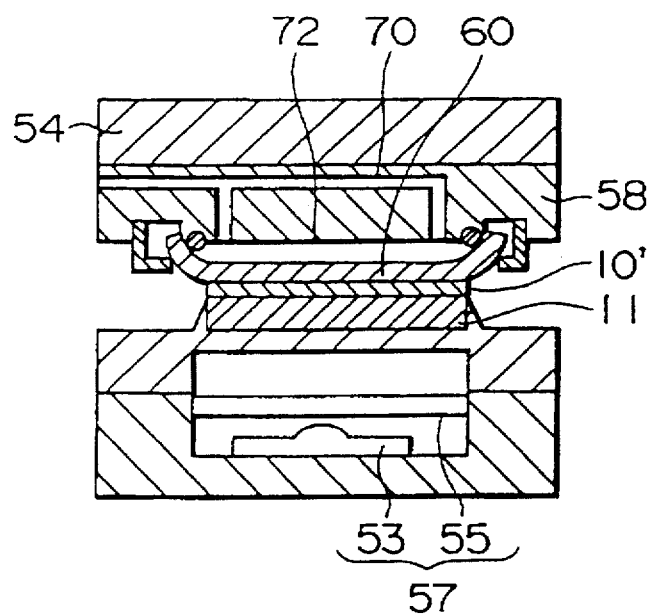
FIG. 7 is a side view showing an example of the manufacturing process in the method of manufacturing the alignment layer.
Figure 8:
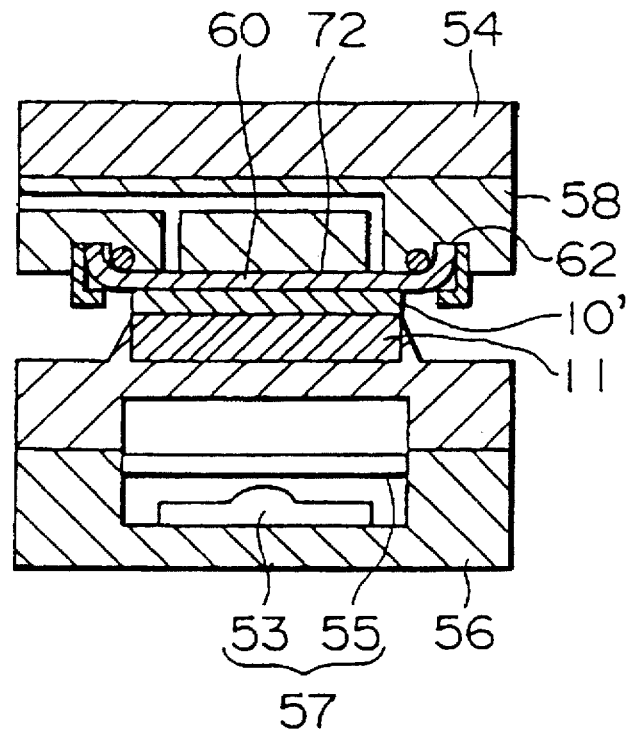
FIG. 8 is a side view showing an example of the manufacturing process in the method of manufacturing the alignment layer.

Then, the upper plate 54 is further moved downwards so that the mold 60 is deformed along the shape of the subject of stamping, thus causing the area of the contact to be widened gradually. Thus, the area of contact is widened to the overall area to which the concave and convex pattern must be stamped finally, as shown in FIG. 7.

Then, the upper plate 54 is further moved downwards, the pressure between the mold 60 and the surface plate 58 is raised to a level higher than the pressure required to stamp the concave and convex pattern. As a result, the release valve (not shown) connected to the air supply passage 70 is opened so that air between the mold 60 and the surface plate 58 is discharged.

Then, the lower surface 72 of the surface plate 58 is brought into close contact with the mold 60 so that the mold 60 is positioned along the lower surface 72 of the surface plate 58. At this time, the ends of the mold 60 are relieved into the relieving groove 62. In the foregoing state, the mold 60 is brought into contact with the polymer resin film 10' for a predetermined time so that the concave and convex pattern of the mold 60 is stamped to the polymer resin film 10', which is the subject of stamping.

Then, the polarized-UV-light irradiation mechanism 57 is activated to irradiate the polymer resin film 10' with polarized UV light so as to harden the polymer resin film 10'. Thus, a state where the polymer resin film 10' cannot be deformed is realized, and then the upper plate 54 is moved upwards so as to separate the mold 60 from the subject of stamping. As a result, the polymer resin film 10', to which the concave and convex pattern has been stamped, is formed into an alignment layer having the concave and convex pattern on the surface thereof.

Since the method of stamping the concave and convex pattern causes the projection portion of the mold 60 is initially brought into contact with the subject of stamping and then the area of contact is gradually widened to the overall range to which the concave and convex pattern must be stamped, air existing between the mold 60 and the subject of stamping is forcibly discharged to the outside of the area of contact between the mold 60 and the subject of stamping.

As a result, the method of stamping a concave and convex pattern according to this modification is able to prevent undesirable introduction of air between the subject of stamping and the mold 60. Thus, the concave and convex pattern of the mold 60 can satisfactorily be stamped to the thin polymer resin film 10' formed on the rigid substrate 11 made of glass or the like.

Since the apparatus for manufacturing an alignment layer according to this modification comprises the mold warping mechanism that blows air between the mold 60 and the surface plate 58 so as to warp the mold 60, which has, on the surface thereof, a concave and convex pattern to be stamped, and which can be deformed, in such a manner that a portion of the mold 60 projects toward the surface thereof, the foregoing method of stamping a concave and convex pattern can reliably be performed.

Third Modification of Manufacturing apparatus

Figure 9:
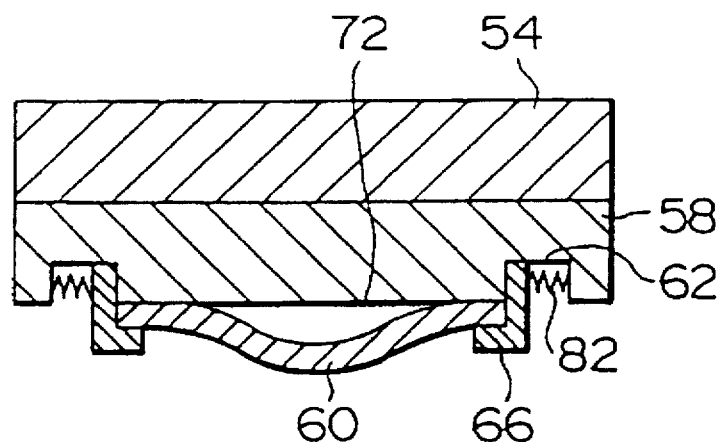
FIG. 9 is a partial cross sectional view showing an example of the apparatus for manufacturing the alignment layer.

FIG. 9 shows an essential portion of a modification of the apparatus for manufacturing an alignment layer shown in FIG. 6. The same elements as those shown in FIG. 6 are given the same reference numerals and they are omitted from description.

The apparatus for manufacturing an alignment layer according to this modification comprises a metal retainer 66 having an L-shape cross sectional shape and received within a relieving groove 62 in such a manner that the metal retainer 66 is able to move between the center of the surface plate 58 and the outer periphery of the same. The metal retainer 66 is always urged to the center of the surface plate 58 by a spring or rubber urging member 82. The metal retainer 66 and the urging member 82 form a mold warping mechanism. The end of the mold 60 is in contact with the inner surface of the metal retainer 66.

In the apparatus for manufacturing an alignment layer according to this modification, the mold 60 is so warped as to project toward the center thereof when it is pressed by the metal retainer 66 urged by the urging member 82.

Also the apparatus for manufacturing an alignment layer according to this modification is able to attain an operation and effect similar to those obtainable from the manufacturing apparatus shown in FIG. 6.

Fourth Modification of Manufacturing apparatus

Figure 10:
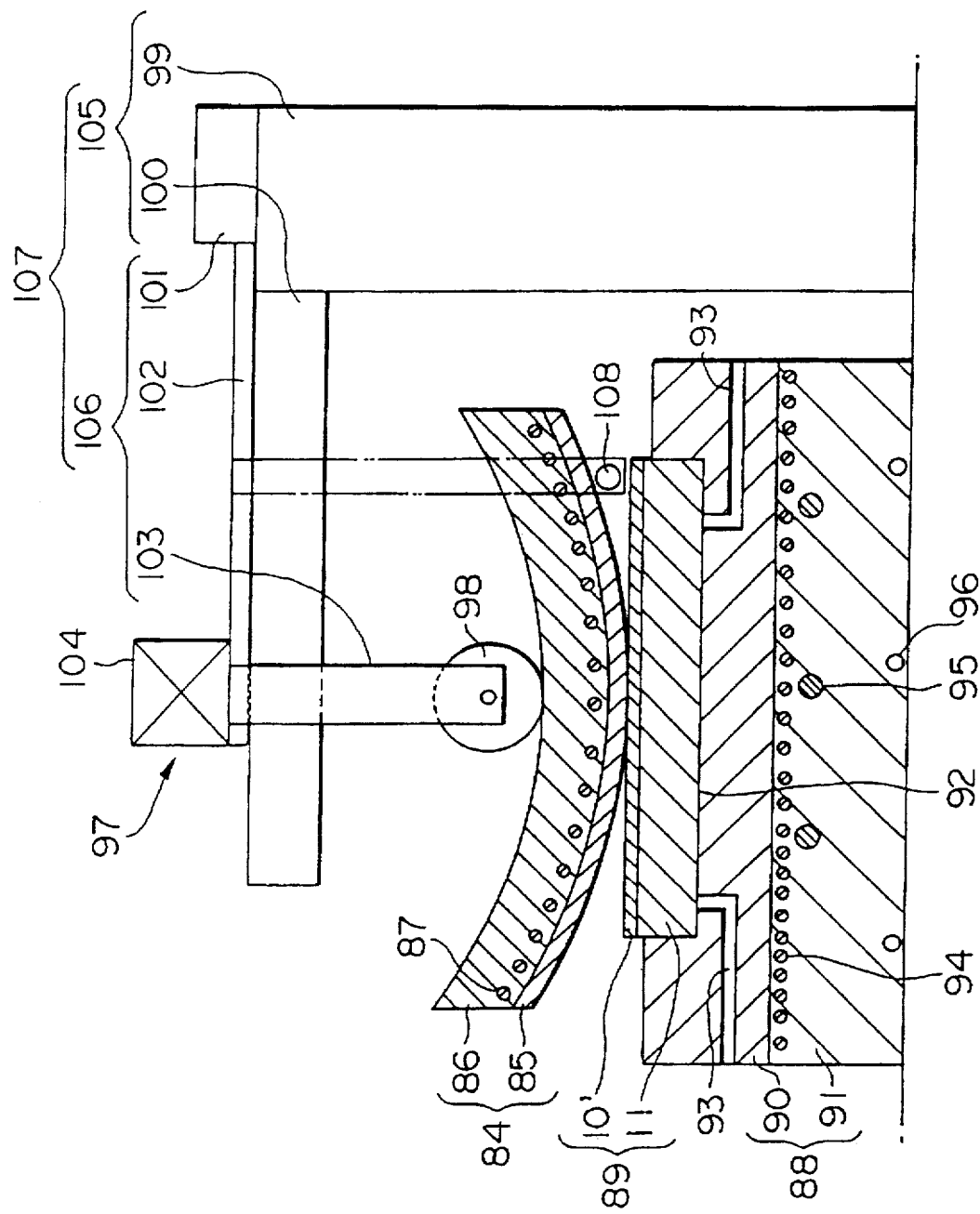
FIG. 10 is a side view showing an example of the apparatus for manufacturing the alignment layer.

FIG. 10 is a schematic view showing a still further modification of the apparatus for manufacturing an alignment layer. The apparatus according to this modification comprises a stamping mechanism 97 having a holding mechanism 88 and a mold 84; and a UV light irradiation mechanism (not shown).

The mold 84 comprises a supporting member 86 and a mold body 85 and is warped along the outer surface of a cylindrical member. The supporting member 86 is made of a thick metal plate so as to maintain the mold body 85 at a predetermined warped shape and to prevent deformation of the same when the apparatus is used. The supporting member 86 includes a heater 87 so that the outer surface of the supporting member 86 is heated uniformly. The mold body 85 is in closely contact with the outer surface of the supporting member 86. The mold body 85 has, on the surface thereof, a concave and convex pattern to be stamped, the mold body 85 being made of a thin metal plate.

The holding mechanism 88 maintains, at a predetermined position, a subject 89 of stamping which is a substrate of a liquid crystal display comprising a polymer resin film 10' formed on a substrate 11. An upper plate 90 of the holding mechanism 88 has a locating concave portion 92 into which the subject 89 of stamping is inserted. An end opening of a vacuumizing exhaust passage 93 is formed in the bottom of the locating concave portion 92. When the subject 89 of stamping has been inserted into the locating concave portion 92 and then air has been discharged through the vacuumizing exhaust passage 93, the subject 89 of stamping is brought into close contact with the bottom of the locating concave portion 92 so as to be secured firmly.

A temperature controlling member 91 is disposed below the upper plate 90. The temperature controlling member 91 is made of a metal of a type that exhibits excellent heat conductivity. A movable heater 94 is disposed adjacent to the top surface of the temperature controlling member 91. The movable heater 94 is used to move the heating position to follow the movement of the position at which the mold 84 and the subject 89 of stamping are in contact with each other, the movable heater 94 comprising a plurality of heaters disposed in parallel to the line on which the mold 84 and the subject 89 of stamping are brought into contact with each other. A sensor and a control apparatus (not shown) are so provided that electric power is supplied to only the portion in which the mold 84 and the subject 89 of stamping are brought into contact with each other or the portion in front of the foregoing contact portion. Preheaters 95 are disposed below the movable heater 94, and a cooling jacket 96 is disposed below the preheater 95. Also the cooling jacket 96 is, similar to each heater forming the movable heater 94, disposed in parallel to the line on which the mold 84 and the subject 89 of stamping are brought into contact with each other.

The stamping mechanism 97 presses the mold 84 against the subject 89 of stamping while moving the position of contact between the mold 84 and the subject 89 of stamping. The stamping mechanism 97 according to this modification comprises a roll 98 and a moving means 107 for moving the roll 98. The roll 98 comes in contact with the inner surface of the mold 84 so as to press the mold 84 against the subject 89 of stamping, the roll 98 being formed into a cylindrical shape which is somewhat longer than the width of the mold 84. The roll 98 is rotatively attached to a support arm 103 of a moving means 107.

The moving means 107 moves the roll 98 along the warped outer surface of the mold 84, the moving means 107 comprising an orbital means 105 and a drive means 106. The orbital means 105 comprises a slide rail 100 for determining the movement passage for the roll 98; and a support column 99 for supporting the slide rail 100.

The drive means 106 moves the roll 98 along the slide rail 100, the drive means 106 comprising the support arm 103, a motor 101 and a connection member 102 for connecting the support arm 103 and the motor 101 to each other.

A load 104 is attached to a portion of the connection member 102 to which the support arm 103 is connected. At an intermediate position of the connection member 102 of the moving means 107, there is suspended a cooling pipe 108 at a position between the mold 84 and the subject 89 of stamping.

Although omitted from illustration in FIG. 10, the slide rail 100 is provided with a polarized-UV-light irradiation mechanism comprising a UV light source for emitting UV light and a polarizer for polarizing UV light. In the manufacturing apparatus according to this modification, after stamping the concave and convex pattern by means of the mold 84 has been completed, the support arm 103 is moved so that the roll 98 and the mold 84 are removed from positions above the polymer resin film 10', and, in place of this, the polarized-UV-light irradiation mechanism is brought to a position above the polymer resin film 10'.

The stamping method to be performed by the apparatus for manufacturing an alignment layer will now be described.

To form the concave and convex pattern on the subject 89 of stamping by using the apparatus according to this modification, electric power is supplied to the preheater 95 of the holding mechanism 88 so that the temperature of the temperature controlling member 91 is maintained at a predetermined level. Then, the subject 89 of stamping is brought into the locating concave portion 92 of the holding mechanism 88. Then, air is exhausted by the vacuumizing exhaust passage 93, and the subject 89 of stamping is secured to the holding mechanism 88.

Then, the mold 84 is placed on the subject 89 of stamping, and the roll 98 of the stamping mechanism 97 is brought into contact with the inner surface of the mold 84. The mold 84 is previously heated over the entire surface thereof by the heater 87. The mold 84 is, due to weights of the roll 98, the load 104 and the dead weight thereof, brought into close contact with the resin film 10' of the subject 89 of stamping.

When the low-speed motor 101 of the stamping mechanism 97 is rotated in the foregoing state, the connection member 102 is extended so as to move the support arm 103 along the slide rail 100 of the orbital means 105. As a result, the roll 98 is moved in the direction of the warp of the mold 84. Thus, the warped mold 84 is rolled so that the area of contact between the mold 84 and the subject 89 of stamping is moved.

The movement of the area of contact between the mold 84 and the subject 89 of stamping can be detected by a sensor (not shown). In response to a signal transmitted by the sensor, the portion of the movable heater 94 provided for the temperature controlling member 91 of the holding mechanism 88, to which electric power is supplied, is sequentially changed. That is, the portion, to which the electric power is supplied, is sequentially moved in the direction of the movement of the roll 98. Thus, the subject 89 of stamping is heated by the movable heater 94 from a lower surface thereof so that its portion, which is in contact with the mold 84, is heated most efficiently. The upper surface of the subject 89 of stamping is so heated that its portion, with which the mold 84 heated by the heater 87 is brought into contact, is heated most efficiently. As a result, the concave and convex pattern of the mold 84 is satisfactorily stamped to the polymer resin film 10' of the subject 89 of stamping.

In the portion, in which the mold 84 has been separated from the subject 89 of stamping due to the movement of the roll 98, heating of the top surface of the subject 89 of stamping by the mold 84 is stopped. The cooling pipe 108, suspended by the connection member 102 of the drive means 106 so as to be moved, quickly cools the top surface of the subject 89 of stamping.

Then, the roll 98 and the mold 84 are moved from the positions above the polymer resin film 10', and the polarized-UV-light irradiation mechanism is moved to a position above the polymer resin film 10' having the concave and convex pattern formed thereon so that the upper surface of the polymer resin film 10' is irradiated with polarized UV light.

The polymer resin film 10' of the subject 89 of stamping having the concave and convex pattern stamped thereon is hardened so that the alignment layer having the stamped concave and convex pattern is obtained.

With the method of stamping the concave and convex pattern according to this modification, the warped mold 84 having, on the surface thereof, the concave and convex pattern to be stamped is rolled with respect to the subject 89 of stamping. Therefore, the portion, in which the mold 84 and the subject 89 of stamping are in contact with each other, is gradually moved so that air existing between the mold 84 and the subject 89 of stamping is discharged to the outside of the contact portion as the contact portion is moved. Therefore, the method of stamping the concave and convex pattern according to this modification is able to prevent undesirable introduction of air between the subject 89 of stamping and the mold 84. Thus, the concave and convex pattern of the mold 84 can satisfactorily be stamped to a thin resin film of a type formed on a rigid substrate body made of glass or the like.

Furthermore, in the method of stamping the concave and convex pattern according to this modification, the contact portion between the mold 84 and the subject 89 of stamping is formed into a substantially linear shape. Therefore, all of desired portions of the mold 84 can satisfactorily be pressed against the subject 89 of stamping without adverse influence of the overall shape of the mold 84 which is being heated. Therefore, the method of stamping the concave and convex pattern according to this modification enables the pressure, under which the portions of the mold 84 are pressed against the subject 89 of stamping, can be made uniform. Thus, the concave and convex pattern can satisfactorily be stamped to the subject 89 of stamping.

The apparatus for manufacturing an alignment layer according to this modification causes the roll 98 of the stamping mechanism 97 to be brought into contact with the inner surface of the mold 84 so as to move the roll 98 toward the direction in which the mold 84 is warped. Thus, the mold 84 pressed by the stamping mechanism 97 is rolled so that the portion, in which the mold 84 and the subject 89 of stamping are in contact with each other, is moved. Therefore, the manufacturing apparatus according to this modification is able to form a continuous concave and convex pattern in a predetermined range of the subject of stamping. Thus, the foregoing method of stamping the concave and convex pattern can be performed smoothly.

Since the apparatus for manufacturing an alignment layer according to this modification comprises the mold 84 that is provided with the heater 87, heating of the warped mold 84 by means of the heater 87 to a predetermined level results in that the portion of the subject 89 of stamping, with which the mold 84 is in contact, is heated. On the other hand, heating of the portion of the subject 89 of stamping, from which the mold 84 has been removed, is interrupted. As a result, the subject 89 of stamping is heated most fiercely when the concave and convex pattern is stamped to the same. Thus, the apparatus for manufacturing an alignment layer according to this modification enables the concave and convex pattern of the mold 84 to be satisfactorily stamped to the subject 89 of stamping.

The apparatus for manufacturing an alignment layer according to this modification comprises the heating means provided for the holding mechanism 88, the heating means moving the heating positions as the position, at which the mold 84 and the subject 89 of stamping are in contact with each other, is moved. In this viewpoint, the apparatus according to this modification enables the concave and convex pattern of the mold 84 to be stamped satisfactorily to the subject 89 of stamping.

[Embodiments of Manufacturing and Experiments]

The liquid crystal displays according to the foregoing embodiments were manufactured and their performances were tested.

First Embodiment

In this embodiment, the present invention was applied to a twisted nematic (TN) liquid crystal display.

γ-butyrolactone was used as a solvent and polyvinyl cinnamate was dissolved in the solvent by 4%. The thus-prepared solution was applied to the surface of a rectangular glass substrate for a liquid crystal display having electrodes on the surface thereof. Then, the applied solution was heated at 80° C. for one minute, and then heated at 180° C. for one hour so that the wet solution was dried.

Then, a cylindrical mold 22 made of epoxy resin having, on the surface thereof, a concave and convex pattern to be stamped was placed above the polymer resin film. The substrate was heated to 150° C. for 5 minutes, and, at the foregoing temperature, the mold 22 was rotated and moved in a state where the mold 22 was pressed against the polymer resin film, so that the concave and convex pattern was stamped.

The pressure, at which the mold 22 was pressed, was set to 100 kg/cm$^2$, and the moving speed was made to be 15 mm/minute.

As a result of the foregoing process, the surface of the polymer resin film had the concave and convex pattern stamped thereto, the concave and convex pattern being in the form of a substantially triangular shape and concave portions and convex portions being repeated in the direction, in which the printing stage was moved, that is, in the lengthwise direction of the glass substrate, as shown in FIG. 1. In this embodiment, the manufactured pattern was such that the height of the convex was 0.2 μm, the length of the inclined surface was 2 μm, and the interval between adjacent convex portions formed in the horizontal direction was 0.3 μm.

Then, the polymer resin film was irradiated with polarized UV light. As a result of the irradiation with UV light, the side chains of the polymer resin were caused to take place cross-linking reactions so as to be a polymer compound as expressed by the foregoing chemical formula ①, so that the shape of the alignment layer was stably held.

Although irradiation with UV light may be performed after the mold has been pressed, it may be performed simultaneously with performing the stamping operation.

Two substrates each having the thus-obtained alignment layer were prepared, and they were overlapped at a predetermined interval provided by a spacer or the like. TN liquid crystals (K-15: trade name of Chisso) were enclosed in the space so that a liquid crystal display was manufactured.

At this time, assembling was so performed that the first direction of the alignment layer of either substrate and the first direction of the alignment layer of the other substrate were made perpendicular to each other.

Note that the distance between the two alignment layers was made to be 5 μm.

The thus-manufactured TN-type liquid crystal display was free from irregularity in the display screen thereof and no discrination took place in the state of the initial alignment and even after 2V AC had been applied.

Therefore, the liquid crystal display comprising the alignment layer manufactured by the method according to this embodiment was able to attain a uniform and sufficiently large pretilt angle.

To detect the degree of alignment of liquid crystal molecules, a two-tone dyestuff (LSB-278 manufactured by Mitsubishi Chemical industries, Ltd.) was added by 1 wt% to nematic liquid crystal, and the two-tone ratio was measured which was the ratio of the transmittance in the lengthwise direction and that in the shorter direction of either substrate with respect to polarized light.

As a result, the two-tone ratio was 10. Thus, liquid crystal molecules being sufficiently aligned can be confirmed.

A TN-type liquid crystal display manufactured similarly to the foregoing device was subjected to a heat cycle test. The heat cycle test was performed such that heat cycle loads are repeatedly applied 20 times in each of which the TN-type liquid crystal display was held at −40° C. for one hour and the same was held at 80° C. for one hour.

As a result, the displaying performance of the liquid crystal display was not affected adversely and it had excellent heat resistance.

The foregoing TN liquid crystal display was subjected to a vibration test. The vibration test conformed to JIS-C 5025A.

As a result, the liquid crystal display manufactured by the method according to this embodiment was not affected adversely and had excellent vibration resistance.

As described above, an assumption can be made that the attained excellent stability against heat and external force indicate that liquid crystal molecules are aligned along the aromatic ring, which is the most stable molecule portions that form the alignment layer.

Second Embodiment

In the second embodiment, a liquid crystal display comprises the polarizing filter that has the structure according to the present invention.

The liquid crystal display according to the second embodiment comprises the polarizing filter that is made of a material including main chains that are stable with respect to UV light; and side chains, each of which has an aliphatic ringing group to which aromatic groups are bonded and which cross-link between the main chains. Furthermore, a dying functional group that absorbs the wavelength, corresponding to the overall visible ray region, is bonded to the aliphatic ringing group, the side chains being substantially aligned in a predetermined direction.

That is, the aliphatic ringing group is positioned between the side chains that cross-link between the main chains, and aromatic groups aligned in a predetermined direction are bonded to each aliphatic ringing group.

A material expressed by the following chemical formula ③ is employed as a preferred material that satisfies the foregoing requirements.

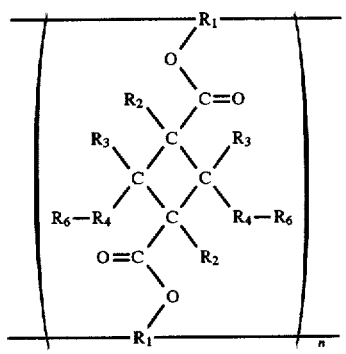

where $R_1$ is —$CH_2CH$ or a material selected from a group consisting of:

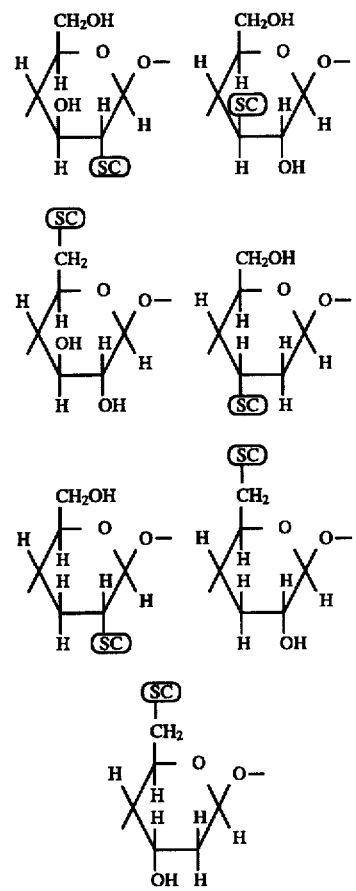

$R_2$ is —H, $R_3$ is —H, $R_4$ is —$C_6H_4$ and $R_6$ is a dying functional group that absorbs light having the wavelength that corresponds to substantially the overall visible ray region.

Although the dying functional group R6 to be bonded may, of course, be of a type that absorbs light having the wavelengths in the overall visible ray region by one aliphatic ringing group thereof, a structure may be employed which comprises monomers in each of which dying functional groups respectively absorbing visible rays having different wavelengths are bonded and in which the polymer absorbs light having the wavelengths that correspond to the overall visible ray region.

For example, a dying functional group expressed by the following chemical formula ④ is a dying functional group that passes light having the wavelength corresponds to red; the mixture, the material having a dying functional group expressed by following chemical formula ⑤ is added to the material having a dying functional group expressed by following chemical formula ⑥, passes light having the wavelength corresponds to green; and a dying functional group expressed by the following chemical formula ⑤ is a dying functional group that passes light having the wavelength corresponds to blue. By respectively bonding the dying functional groups ④, ⑤, and ⑥ to $R_6$ of the compound expressed by the foregoing chemical formula ③, the compound ③ is enabled to absorb light in the overall visible ray region. That is, visible rays except red are absorbed by the dying functional group ④, visible rays except green are absorbed by the dying functional groups ⑤ and ⑥ and visible rays except blue are absorbed by the dying functional group ⑤ so that light having the wavelengths in the overall visible ray region is absorbed.

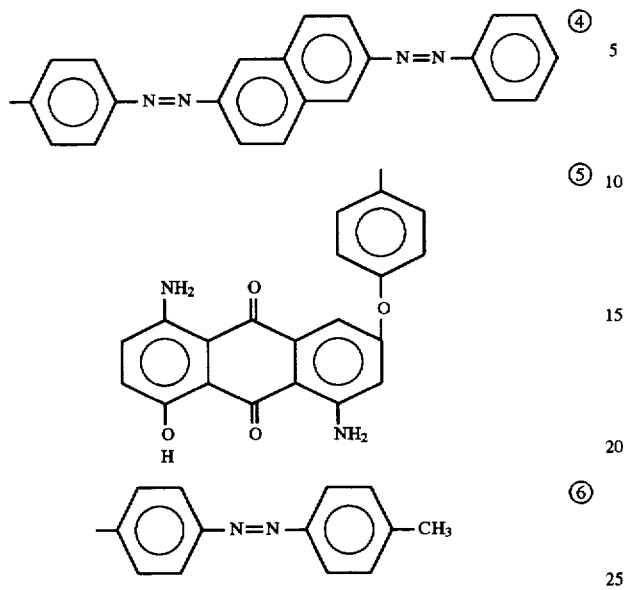

In the compound forming the polarizing filter, the side chains, to each of which the dying functional groups are bonded, are aligned in a predetermined direction, whereby only light beams along the foregoing alignment direction are absorbed by the polarizing filter and visible rays that are not along the alignment direction are not allowed to pass through the polarizing filter. Thus, a polarizing function is realized.

To manufacture the polarizing filter according to this embodiment, a polymer resin, which is the material of the polarizing filter, is applied to a substrate.

The material of the polarizing filter according to this embodiment is a compound comprising main chains, that is stable with UV light; and side chains, each of which contains a functional group, which contains dying functional group, that absorbs light having the wavelength corresponding to substantially the overall visible ray region, and a multiple bond, that is capable of performing cross-linking reactions, and which absorbs light in the UV light region.

As a preferred polymer compound of the foregoing type, a compound expressed by the following chemical formula ⑦ may be employed.

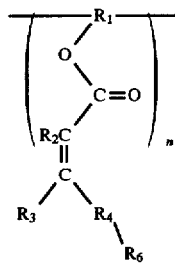

where $R_1$ is —$CH_2CH$ or a material selected from a group consisting of.

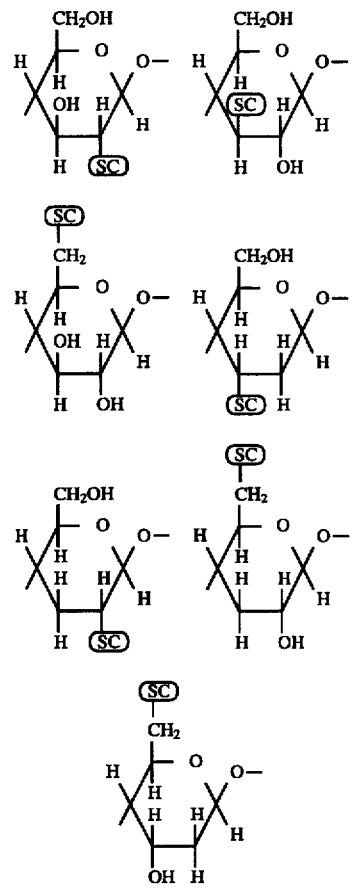

$R_2$ is —H, $R_3$ is —H, $R_4$ is —$C_6H_4$ and $R_6$ is any of the foregoing dying functional groups ④, ⑤ and ⑥. As the polymer compound above, all of the foregoing components are included.

Pre-drying and drying processes are performed, the substrate is heated, and an aligning member is moved on the surface of the polymer resin film in a predetermined direction in a contact manner to apply pressure to the surface of the polymer resin film.

As the aligning member, it is preferable that a member be employed which is made of an elastic material, at least the surface of which has appropriate flexibility. For example, a rubber roller is an appropriate aligning member.

Then, polarized UV light having the axis of polarization in a direction perpendicular to the direction, in which the aligning member is moved, are applied so as to align the side chains in a predetermined direction so that a polarizing filter thus having the polarizing function is manufactured.

The foregoing polarizing filter can be formed into the liquid crystal display by simply adjusting the direction, in which the aligning member, such as the rubber roller, is moved and the direction of polarization of UV light to be applied, with respect to the angle of the axis of alignment of the liquid crystals. Thus, the conventional difficulty in performing accurate matching required at the time of forming the polarizing filter can be moderated.

Furthermore, since the liquid crystal displays can be manufactured in an in-line manner in a clean room exhibiting excellent cleanliness, and as well as the liquid crystal display can be manufactured in a non-contact manner, mixture of foreign matters and generation of static electricity can be prevented.

Since the polarizing function is given by applying predetermined and polarized UV light, repeated manufacturing of polarizing filters with respect to a plurality of pixels can easily be performed.

Therefore, the factors that must be satisfied in the manufacturing process can be moderated, and therefore a liquid crystal display having a high quality polarizing filter can be obtained by a simple manufacturing method.

Furthermore, the direction of polarization of the polarizing filter can easily be maintained with respect to a plurality of liquid crystal displays. Thus, relative scattering among a plurality of liquid crystal displays can be prevented and the manufacturing yield can be improved.

The polarizing filter is disposed in such a manner that two filters form a pair and one of the filters is disposed below the liquid crystal 113 and another filter is disposed above the liquid crystal 113. The polarizing filters according to the present invention may be employed as the two filters or the polarizing filter may be employed as either of the upper or the lower filter.

Third Embodiment

A third embodiment has a structure that a color filter according to the present invention is provided for a liquid crystal display.

The liquid crystal display according to the third embodiment comprises the color filter made of a material comprising main chains that are stable with respect to UV light; and side chains, which has an aliphatic ringing group, to which aromatic groups are bonded and which cross-link between the main chains. A dying functional group passing light having wavelength, that is a portion of the visible ray region, is bonded to the aliphatic ringing group.

A compound expressed by the following chemical formula ⑧ is employed as the preferred compound that satisfies the foregoing requirements.

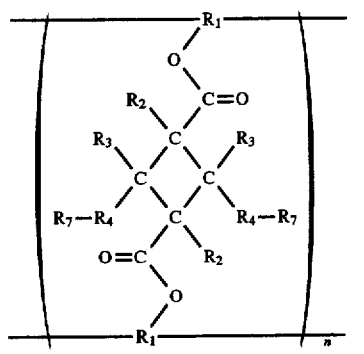

where $R_1$ is —$CH_2CH$ or a material selected from a group consisting of

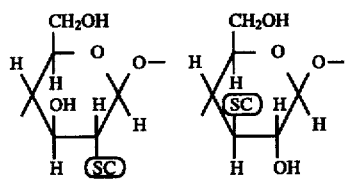

-continued

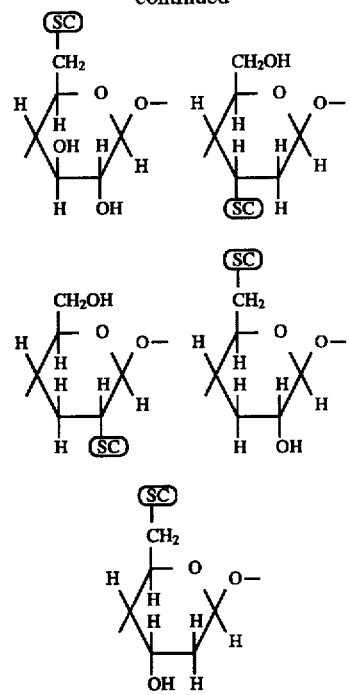

$R_2$ is —H, $R_3$ is —H, $R_4$ is —$C_6H_4$ and $R_7$ is a dying functional group that passes only predetermined visible rays.

That is, the red color filter comprises a dying functional group that pass red visible ray, the green color filter comprises a dying functional group that passes green visible ray, and the blue color filter comprises a dying functional group that passes blue visible ray.

For example, the dying functional group, that passes light having the wavelength corresponding to red, may be the dying functional group expressed by the foregoing chemical formula ④, the mixture, the material having a dying functional group expressed by foregoing chemical formula ⑤ is added to the material having a dying functional group expressed by foregoing chemical formula ⑥, passes light having the wavelength corresponds to green, and the dying functional group, that passes light having the wavelength corresponding to blue, may be the dying functional group expressed by the foregoing chemical formula ⑤.

To manufacture the color filter according to this embodiment, the material for forming the color filter is applied to the substrate. Since the material is a UV light setting material, the substrate is then irradiated with UV light so as to be hardened. Note that UV light to be applied at this time is not required to be polarized UV light.

The material of the color filter according to this embodiment is a component comprising main chains that are stable with respect to UV light; and side chains each having a functional group, which contains a dying functional group that passes light having the wavelength that is a portion of the visible ray region and a multiple bond that is capable of performing cross-linking reactions, and which absorbs light in the UV light region.

As the polymer compound of the foregoing type, it is preferable that a compound expressed by the following chemical formula ⑨ be employed.

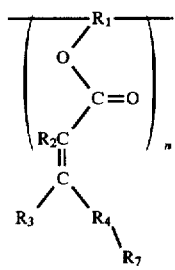

(9)

where $R_1$ is —$CH_2CH$ or a material selected from a group consisting of

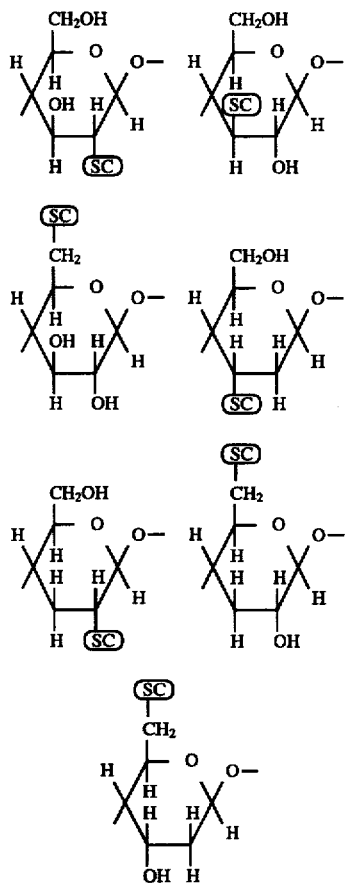

$R_2$ is —H, $R_3$ is —H, $R_4$ is —$C_6H_4$ and $R_7$ may be a dyestuff selected from a group consisting of the dying functional groups ④, ⑤ and ⑥.

The color filter according to this embodiment has the structure that chemical reactions enabled by bonding the dying functional group as the substituent of the compound are used to color the color filter in place of adding a dye or a pigment. The adjustment of the density of each color is not performed by an additive, such as a dye or a pigment. Therefore, a necessity of increasing the thickness of the resin forming the base to attain a dark color does not arise easily.

Therefore, a thin-film color filter is able to realize a clear and sufficient dark color.

Thus, the influence of absorption of intrinsic light of the resin forming the base can be prevented, and therefore the displayed color cannot be subdued. Furthermore, a problem in that reduction in the quantity of transmitted light causes the image to be darkened can be prevented.

Even if the color is changed, the color filter can be formed thinly without a necessity of changing the thickness of the same. Therefore, the controllability of the gap in the liquid crystals can be improved.

Although the liquid crystal display 1 shown in FIG. 11 comprises the color filter 119 that is formed on the substrate 112 disposed upper than the liquid crystals 113, the color filter 119 may be formed on the lower substrate 111.

Fourth Embodiment

The liquid crystal display according to a fourth embodiment has the structure that the material for forming the alignment layer and that for forming the polarizing filter are common material according to the present invention.

That is, the alignment layer is made of a material according to the first embodiment that comprises main chains, that are stable with respect to UV light; and side chains each of which has an aliphatic ringing group to which aromatic groups are bonded, and which cross-link between the main chains. Furthermore, the aromatic groups are aligned substantially in the following first direction.

That is, as shown in FIG. 3, the aliphatic ringing groups are provided for the side chains that cross-link between the main chains. Furthermore, aromatic groups aligned in the first direction of the alignment layer are bonded to the aliphatic ringing group.

As a material that satisfies the foregoing requirements, a material expressed by the foregoing chemical formula ① is employed preferably.

The alignment layer made of the foregoing material, as shown in FIG. 1, has, on the surface thereof, a plurality of roof-like concave and convex rows 18, each of which is formed by repeatedly, in a first direction, forming convex portions 16 each of which consists of a longer side portion 12 and a shorter side portion 14.

Between the roof-like concave and convex rows 18, there are, also in the first direction, formed a plurality of valley-like concave and convex rows 20 having a similar shape to that of the roof-like concave and convex rows 18 but lower than the same.

Since the roof-like concave and convex rows 18 and the valley-like concave and convex rows 20 having the different heights are adjacently and alternately formed, concaves and convexes having unit length U', that is shorter than unit length U of repetition of the concaves and convexes formed in the first direction, are formed in a second direction substantially perpendicular to the first direction.

It is preferable that the unit length U of repetition of the concaves and convexes formed in the first direction be 50 μm or shorter and the unit length U' of repetition in the second direction be 3 μm or shorter, more preferably the repetition unit length U be 20 μm or shorter and the repetition unit length U' be 1.2 μm or shorter.

Furthermore, it is preferable that the inclination angle θ of the edge line of the longer side portion 12 be 1° or larger, as shown in FIG. 2.

Each convex portion 16 of the concaves and convexes in the first direction is formed into a substantially triangular shape having two asymmetric sides, as shown in FIG. 2. That is, the shape is so determined that the ratio $r_2/r_1$ of the right and left portions of the apex angle divided by a perpendicular downwards drawn from the apex of the convex portion 16 is not 1. The shape of the convex portion 16 may be any of a variety of shapes exemplified by a shape like a sine wave, a wedge-like shape and a triangular shape. If the convex portion 16 is formed into the triangular shape, the apex may be rounded or cut into a flat shape. If the convex portion 16 is formed into the triangular shape, it is preferable that the ratio $r_2/r_1$ of the right and left portions of the apex angle divided by a perpendicular downwards drawn from the apex of the convex portion 16 be 1.2 or larger.

The liquid crystal display according to the fourth embodiment comprises the polarizing filter made of the foregoing material employed to form the alignment layer. That is, a material is employed in which $R_5$ of the compound expressed by chemical formula ① is replaced by a dying functional group that absorbs light having the wavelength corresponding to the overall visible ray region.

Although the dying functional group to be bonded may, of course, be of a type that absorbs light having the wavelengths in the overall visible ray region by one aliphatic ringing group thereof, a structure may be employed that comprises monomers in each of which dying functional groups respectively absorbing visible rays having different wavelengths are bonded and that the polymer absorbs light having the wavelengths that correspond to the overall visible ray region.

That is, as $R_5$ of the compound expressed by the foregoing chemical formula ①, the dying functional groups ④, ⑤ and ⑥ are respectively bonded so that the compound ① is able to absorb light in the visible ray region. Namely, visible rays except red are absorbed by the dying functional group ④, visible rays except green are absorbed by the dying functional groups ⑤ and ⑥ and visible rays except blue are absorbed by the dying functional group ⑤ so that light having the wavelengths in the overall visible ray region is absorbed.

In the compound forming the polarizing filter, the side chains, to each of which the dying functional group is bonded, are aligned in a predetermined direction. Therefore, only light along the alignment direction is allowed to pass through the polarizing filter, whereas visible rays that are not along the alignment direction are absorbed. As a result, the polarizing function can be obtained.

To manufacture the alignment layer of the liquid crystal display according to the fourth embodiment, the manufacturing method according to the first embodiment may be employed. The polarizing filter may be manufactured by the manufacturing method according to the second embodiment.

That is, to manufacture the alignment layer by using the compound expressed by the foregoing chemical formula ②, a material selected from a group consisting of —H, $CH_3$, —$OCH_3$, —$C_2H_5$, —$OC_2H_5$, —$NO_2$, —CN, and —$C_6H_4$CN is bonded may be employed as $R_5$. To manufacture the alignment layer, a material may be employed in which $R_5$ is replaced by, for example, a dying functional group expressed by any of chemical formulas ④, ⑤ or ⑥.

The liquid crystal display according to the fourth embodiment comprises the alignment layer that is formed by using the stamping method. However, the force for maintaining the shape of the concave and convex pattern of the alignment layer is satisfactory, and therefore a sufficiently large pretilt angle can be maintained. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration and heat resistance can be obtained, and the reliability as the liquid crystal display can be improved.

As for the polarizing filter, when the polarizing filter is formed in the liquid crystal display, the direction, in which the aligning member is moved, and direction of polarization of UV light to be applied are adjusted with respect to the angle of the axis of alignment of liquid crystals. Therefore, the conventional difficulty arising in accurate matching at the time of forming the polarizing filter can be moderated.

Furthermore, the liquid crystal displays can be manufactured in an in-line and non-contact manner in a clean room exhibiting excellent cleanliness so that mixture of foreign matters and generation of static electricity are prevented.

Since the polarizing function is given by applying predetermined and polarized UV light, repeated manufacturing of the polarizing filters having the same characteristics with respect to a plurality of pixels can easily be performed.

Therefore, the requirements in the manufacturing process can be moderated so that a liquid crystal display having a high quality polarizing filter is obtained by a simple manufacturing method. Furthermore, the directions of polarization of polarizing filters with respect to a plurality of liquid crystal displays can easily be maintained. As a result, relative scattering among a plurality of liquid crystal displays can be prevented, and thus the manufacturing yield can be improved.

The liquid crystal display according to the fourth embodiment comprises the alignment layer and the polarizing filter that are made of substantially the same type compounds. Therefore, another material is not required and thus the cost of the material can significantly be reduced.

The dying functional group to be introduced absorbs light having the wavelength corresponding to a specific visible ray region (for example, the wavelength that corresponds to blue, the wavelength that corresponds to red, the wavelength that corresponds to green, and the like). Therefore, also a roll as a color filter can be performed, and thus it can be used as a polarizing color filter. As a result, the cost of the material and the manufacturing cost can further be reduced. In addition, the size of the liquid crystal display can be reduced.

Fifth Embodiment

A liquid crystal display according to a fifth embodiment comprises the alignment layer and the color filter that are made of the same material according to the present invention.

That is, the alignment layer is, as described in the first embodiment, made of the material comprising main chains, that are stable with respect to UV light; and side chains each of which has an aliphatic ringing group to which aromatic groups are bonded, and which cross-link between the main chains. Furthermore, the aromatic groups are aligned substantially in the following first direction.

That is, as shown in FIG. 3, the aliphatic ringing group is provided for the side chain that cross-links between the main chains, and aromatic groups aligned in the first direction of the alignment layer are bonded to the aliphatic ringing group.

As a material that satisfies the foregoing requirements, it is preferable that, for example, the material expressed by the foregoing chemical formula ① be employed.

The alignment layer made of the foregoing material, as has been described in the first embodiment, has, on the surface thereof, a plurality of roof-like concave and convex rows 18, each of which is formed by repeatedly, in a first direction, forming convex portions 16 each of which consists of a longer side portion 12 and a shorter side portion 14.

Between the roof-like concave and convex rows 18, there are, also in the first direction, formed a plurality of valley-like concave and convex rows 20 having a similar shape to that of the roof-like concave and convex rows 18 but lower than the same.

Since the roof-like concave and convex rows 18 and the valley-like concave and convex rows 20 having the different heights are adjacently and alternately formed, concaves and convexes having unit length U', that is shorter than unit length U of repetition of the concaves and convexes formed in the first direction, are formed in a second direction substantially perpendicular to the first direction.

The liquid crystal display according to the fifth embodiment comprises the color filter made of the material employed to form the alignment layer. That is, a material is employed in which $R_5$ of the compound expressed by chemical formula ① is replaced by a dying functional group that passes predetermined visible rays described in the third embodiment.

Namely, as the red color filter, the dying functional group that passes the red visible ray is employed; as the green color filter, the dying functional group that passes the green visible ray is employed; and as the blue color filter, the dying functional group that passes the blue visible ray is employed.

For example, the dying functional group that passes light having the wavelength corresponding to red is exemplified by the dying functional group expressed by the foregoing chemical formula ④; the mixture, the material having a dying functional group expressed by foregoing chemical formula ⑤ is added to the material having a dying functional group expressed by foregoing chemical formula ⑥, passes light having the wavelength corresponds to green; and the dying functional group that passes light having the wavelength corresponding to blue is exemplified by the dying functional group expressed by the foregoing chemical formula ⑤.

To manufacture the alignment layer of the liquid crystal display device according to the fifth embodiment, the manufacturing method according to the first embodiment may be employed and the color filter may be manufactured by the manufacturing method according to the third embodiment.

The alignment layer is manufactured by the compound expressed by the foregoing chemical formula ②, a material selected from a group consisting of —H, $CH_3$, —$OCH_3$, —$C_2H_5$, —$OC_2H_5$, —$NO_2$, —CN, and —$C_6H_4CN$ is bonded may be employed as To manufacture the color filter, a material may be employed in which $R_5$ is replaced by, for example, a dying functional group expressed by any of chemical formulas ④, ⑤ or ⑥.

The liquid crystal display according to the fifth embodiment comprises the alignment layer that is formed by using the stamping method. However, the force for maintaining the shape of the concave and convex pattern of the alignment layer is satisfactory, and therefore a sufficiently large pretilt angle can be maintained. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration resistance and heat resistance can be obtained, and the reliability as the liquid crystal display can be improved.

The color filter has the structure that no dyestuff nor pigment is added and that the adjustment of the density of each color is not performed by an additive, such as a dye or a pigment. Therefore, a necessity of increasing the thickness of the resin forming the base to attain a dark color does not arise easily. Therefore, a thin-film color filter is able to realize a clear and sufficient dark color. Thus, the influence of absorption of intrinsic light of the resin forming the base can be prevented, and therefore the displayed color cannot be subdued. Furthermore, a problem in that reduction in the quantity of transmitted light causes the image to be darkened can be prevented.

Even if the color is changed, the color filter can be formed thinly without a necessity of changing the thickness of the same. Therefore, the controllability of the gap in the liquid crystals can be improved.

The liquid crystal display according to the fifth embodiment comprises the color filter that is made of the compound of the type employed to form the alignment layer, the compound containing the dying functional group introduced thereof. Therefore, the same type material can be used to manufacture the alignment layer and the color filter. As a result, the necessity of using individual and different materials can be eliminated, whereby the cost of the material can significantly be reduced.

Sixth Embodiment

A liquid crystal display according to a sixth embodiment is characterized in that its alignment layer also serves as the polarizing filter.

Thus, the polarizing filters 123 and 124 shown in FIG. 11 are omitted from the structure.

In the sixth embodiment, the alignment layer is made of a compound comprising: main chains, that are stable with respect to UV light; and side chains each of which has an aliphatic ringing group to which aromatic groups are bonded, and which cross-link between the main chains. Furthermore, a dying functional group that absorbs light having the wavelength that corresponds to the overall visible ray region is bonded to the aliphatic ringing group. That is, the material for the polarizing filter described in the second embodiment is used to manufacture the alignment layer. The aromatic groups provided for the side chains must be aligned substantially in a predetermined direction.

Therefore, the liquid crystal display according to this embodiment comprises the alignment layer made of the compound according to the present invention, whereby the alignment layer as well as has the function as the polarizing filter. As a matter of course, the alignment layer has the function of aligning liquid crystals. Therefore, similarly to the alignment layer according to the first embodiment, the liquid crystal display according to this embodiment has, on the surface thereof, a plurality of roof-like concave and convex rows 18, each of which is formed by repeatedly, in a first direction, forming convex portions 16 each of which consists of a longer side portion 12 and a shorter side portion 14, as shown in FIG. 1.

Between the roof-like concave and convex rows 18, there are, also in the first direction, formed a plurality of valley-like concave and convex rows 20 having a similar shape to that of the roof-like concave and convex rows 18 but lower than the same.

Since the roof-like concave and convex rows 18 and the valley-like concave and convex rows 20 having the different heights are adjacently and alternately formed, concaves and convexes having unit length U', that is shorter than unit length U of repetition of the concaves and convexes formed in the first direction, are formed in a second direction substantially perpendicular to the first direction.

To manufacture the alignment layer of the liquid crystal display according to this embodiment, the compound according to the second embodiment and expressed by chemical formula ⑨ is employed; the substrate is heated; and an aligning member, such as a rubber roller, is moved in a direction perpendicular to the first direction.

Then, as described in the first embodiment, the substrate is heated, and the mold having the concave and convex pattern to be stamped is pressed against the top surface of the polymer resin film so that the concave and convex pattern formed on the pressing surface of the mold is stamped to the polymer resin film. Then, the polymer resin film having the concave and convex pattern formed on the surface thereof is irradiated with polarized UV light in such a manner that the direction of polarization is perpendicular to the direction, in which the aligning member is moved, and the same coincides with the first direction. Thus, the polymer resin film is hardened so that the alignment layer is formed.

As a result, in the compound forming the polymer resin film, the side chains absorb UV light and perform cross-linking reactions so that the aliphatic ringing groups are formed. Furthermore, the aromatic groups bonded to the aliphatic ringing group are aligned in the first direction of the polymer resin film so that the polymer resin film is hardened.

Note that irradiation with UV light may be performed simultaneously with performing the stamping operation.

The liquid crystal display according to this embodiment, similarly to the first embodiment, comprises the alignment layer that is formed by using the stamping method. However, the force for maintaining the shape of the concave and convex pattern of the alignment layer is satisfactory, and therefore a sufficiently large pretilt angle can be maintained. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration resistance and heat resistance can be obtained, and the reliability as the liquid crystal display can be improved.

The alignment layer also has the function as the polarizing filter. The foregoing function can be realized by simply adjusting the direction, in which the aligning member, such as the rubber roller, is moved and the direction of polarization of UV light to be applied, with respect to the angle of alignment of the liquid crystals. Thus, the conventional difficulty in accurate matching required at the time of forming the polarizing filter can be moderated.

Furthermore, since the liquid crystal displays can be manufactured in an in-line manner in a clean room exhibiting excellent cleanliness, and as well as the liquid crystal display can be manufactured in a non-contact manner, mixture of foreign matters and generation of static electricity can be prevented.

Since the polarizing function is given by applying predetermined and polarized UV light, repeated manufacturing of polarizing filters with respect to a plurality of pixels can easily be performed.

Therefore, the factors that must be satisfied in the manufacturing process can be moderated, and therefore a liquid crystal display having a high quality polarizing filter can be obtained by a simple manufacturing method.

Furthermore, the direction of polarization of the polarizing filter can easily be maintained with respect to a plurality of liquid crystal displays. Thus, relative scattering among a plurality of liquid crystal displays can be prevented and the manufacturing yield can be improved.

The liquid crystal display having the structure, in which the alignment layer and the polarizing filter are formed by a common member, enables the cost of the material to be reduced because the independent polarizing filter can be omitted. Furthermore, the manufacturing processes can be decreased and thus the manufacturing cost can significantly be reduced.

Since the thickness of the liquid crystal display can be reduced, a further light weight and small size flat display can be realized.

Seventh Embodiment

A liquid crystal display according to a seventh embodiment is a color liquid crystal display characterized in that its alignment layer and the color filter are realized by a common member.

Thus, the color filter 119 shown in FIG. 11 can be omitted.

In the seventh embodiment, the alignment layer is made of a compound comprising: main chains, that are stable with respect to UV light; and side chains each of which has an aliphatic ringing group to which aromatic groups are bonded, and which cross-link between the main chains. Furthermore, a dying functional group is bonded to the aliphatic ringing group.

That is, the material for the color filter described in the third embodiment is used to form the alignment layer in such a manner that a predetermined dying functional group, for example, the dying functional groups, which are respectively expressed by the foregoing chemical formulas ④, ⑤ and ⑥ are used for each pixel so that colored alignment layer is manufactured.

Therefore, in the liquid crystal display according to this embodiment, the alignment layer is made of the compound according to the present invention so that it has the function as the color filter. As a matter of course, the alignment layer has the function of aligning liquid crystals. Also the liquid crystal display according to this embodiment, similarly to the alignment layer according to the first embodiment and as shown in FIG. 1, has, on the surface thereof, a plurality of roof-like concave and convex rows 18, each of which is formed by repeatedly, in a first direction, forming convex portions 16 each of which consists of a longer side portion 12 and a shorter side portion 14.

Between the roof-like concave and convex rows 18, there are, also in the first direction, formed a plurality of valley-like concave and convex rows 20 having a similar shape to that of the roof-like concave and convex rows 18 but lower than the same.

Since the roof-like concave and convex rows 18 and the valley-like concave and convex rows 20 having the different heights are adjacently and alternately formed, concaves and convexes having unit length U', that is shorter than unit length U of repetition of the concaves and convexes formed in the first direction, are formed in a second direction substantially perpendicular to the first direction.

To manufacture the alignment layer of the liquid crystal display according to this embodiment, the compound according to the third embodiment and expressed by chemical formula ⑨ is employed; the substrate is heated, and the mold having the concave and convex pattern to be stamped is pressed against the top surface of the polymer resin film as described in the first embodiment so that the concave and convex pattern formed on the pressing surface of the mold is stamped to the polymer resin film. Then, the polymer resin film having the concave and convex pattern formed on the surface thereof is irradiated with polarized UV light so that the polymer resin film is hardened and the alignment layer is formed.

Thus, in the compound forming the polymer resin film, the side chains absorb UV light and perform cross-linking reactions so that the aliphatic ringing groups are formed. Furthermore, the aromatic groups bonded to the aliphatic ringing group are aligned in the first direction of the polymer resin film so that the polymer resin film is hardened.

Note that irradiation with UV light may be performed simultaneously with performing the stamping operation.

The liquid crystal display according to this embodiment, similarly to the first embodiment, comprises the alignment layer that is formed by using the stamping method. However, the force for maintaining the shape of the concave and convex pattern of the alignment layer is satisfactory, and therefore a sufficiently large pretilt angle can be maintained. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration resistance and heat resistance can be obtained, and the reliability as the liquid crystal display can be improved.

The alignment layer has the function as the color filter that is not realized by adding a dye or a pigment. The adjustment of the density of each color is not performed by an additive, such as a dye or a pigment. Therefore, a necessity of increasing the thickness of the resin forming the base to attain a dark color does not arise easily. Therefore, a thin-film color filter is able to realize a clear and sufficient dark color. Thus, the influence of absorption of intrinsic light of the resin forming the base can be prevented, and therefore the displayed color cannot be subdued. Furthermore, a problem in that reduction in the quantity of transmitted light causes the image to be darkened can be prevented.

Even if the color is changed, the color filter can be formed thinly without a necessity of changing the thickness of the same. Therefore, the controllability of the gap in the liquid crystals can be improved.

The liquid crystal display according to the seventh embodiment is a liquid crystal display of a type in which the colored alignment layers are applied to respective pixels. Therefore, light beams are allowed to pass through the alignment layer so as to be coloring polarized light beams for the respective colors. Thus, a color filter, that is individual from the alignment layer, is not required so that a simple color liquid crystal display is formed.

The liquid crystal display, in which the alignment layer and the color filter are formed by a common element, enables the cost of the material to be reduced because the independent color filter can be omitted. Furthermore, the manufacturing processes can be decreased and thus the manufacturing cost can significantly be reduced.

Since the thickness of the liquid crystal display can be reduced, a further light weight and small size flat display can be realized.

Eighth Embodiment

A liquid crystals according to an eighth embodiment is a color liquid crystal display characterized in that its alignment layer has the functions of the polarizing filter and the color filter.

Therefore, the polarizing filters 123 and 124 and the color filter 119 shown in FIG. 11 are not required.

That is, in the eighth embodiment, the alignment layer is made of a compound comprising: main chains, that are stable with respect to UV light; and side chains each of which has an aliphatic ringing group to which aromatic groups are bonded, and which cross-link between the main chains. Furthermore, a dying functional group is bonded to the aliphatic ringing group.

That is, the material of the color filter described in the third embodiment is used to form the alignment layer so that a predetermined dying functional group, for example, the dying functional group respectively expressed by the foregoing chemical formulas ④, ⑤ and ⑥ is used for each pixel so that a colored alignment layer is formed.

Therefore, the liquid crystal display according to this embodiment comprises the alignment layer made of the foregoing compound according to the present invention to have the functions as the polarizing filter and the color filter. As a matter of course, it has the function of aligning liquid crystals. Accordingly, the liquid crystal display according to this embodiment has, on the surface thereof, a plurality of roof-like concave and convex rows 18, each of which is formed by repeatedly, in a first direction, forming convex portions 16 each of which consists of a longer side portion 12 and a shorter side portion 14.

Between the roof-like concave and convex rows 18, there are, also in the first direction, formed a plurality of valley-like concave and convex rows 20 having a similar shape to that of the roof-like concave and convex rows 18 but lower than the same.

Since the roof-like concave and convex rows 18 and the valley-like concave and convex rows 20 having the different heights are adjacently and alternately formed, concaves and convexes having unit length U', that is shorter than unit length U of repetition of the concaves and convexes formed in the first direction, are formed in a second direction substantially perpendicular to the first direction. Furthermore, to exhibit the polarizing function, the side chains must be aligned substantially in a predetermined direction.

To manufacture the alignment layer of the liquid crystal display according to this embodiment, the compound according to the third embodiment and expressed by chemical formula ⑨ is employed; the substrate is heated; and an aligning member is moved in a direction perpendicular to the first direction.

Then, as described in the first embodiment, the substrate is heated, and the mold having the concave and convex pattern to be stamped is pressed against the top surface of the polymer resin film so that the concave and convex pattern formed on the pressing surface of the mold is stamped to the polymer resin film. Then, the polymer resin film having the concave and convex pattern formed on the surface thereof is irradiated with polarized UV light in such a manner that the direction of polarization is perpendicular to the direction, in which the aligning member is moved, and the same coincides with the first direction. Thus, the polymer resin film is hardened so that the alignment layer is formed.

Thus, in the compound forming the polymer resin film, the side chains absorb UV light and perform cross-linking reactions so that the aliphatic ringing groups are formed. Furthermore, the aromatic groups bonded to the aliphatic ringing group are aligned in the first direction of the polymer resin film so that the polymer resin film is hardened.

Note that irradiation with UV light may be performed simultaneously with performing the stamping operation.

The liquid crystal display according to this embodiment comprises the alignment layer that is formed by using the stamping method. However, the force for maintaining the shape of the concave and convex pattern of the alignment layer is satisfactory, and therefore a sufficiently large pretilt angle can be maintained. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration resistance and heat resistance can be obtained, and the reliability as the liquid crystal display can be improved.

The alignment layer has the function to serve as the polarizing filter which is realized in such a manner that the direction, in which the aligning member, such as the rubber roller, is moved, and direction of polarization of UV light to be applied are adjusted with respect to the angle of the axis of alignment of liquid crystals. Therefore, the conventional difficulty arising in accurate matching at the time of forming the polarizing filter can be moderated.

Furthermore, the liquid crystal displays can be manufactured in an in-line and non-contact manner in a clean room exhibiting excellent cleanliness so that mixture of foreign matters and generation of static electricity are prevented.

Since the polarizing function is given by applying predetermined and polarized UV light, repeated manufacturing of the polarizing filters having the same characteristics with respect to a plurality of pixels can easily be performed.

Therefore, the requirements in the manufacturing process can be moderated so that a liquid crystal display having a high quality polarizing filter is obtained by a simple manufacturing method.

Furthermore, the directions of polarization of polarizing filters with respect to a plurality of liquid crystal displays can easily be maintained. Thus, relative scattering among a plurality of liquid crystal displays can be prevented, and thus the manufacturing yield can be improved.

The liquid crystal display according to the eighth embodiment is the liquid crystal display in which the colored alignment layer is applied to each pixel. Thus, light beams allowed to pass through the alignment layer are made to be colored polarized light beams for the respective colors. Thus, the alignment layer has the function to serve as the color filter. The color filter has the structure that no dyestuff nor pigment is added and that the adjustment of the density of each color is not performed by an additive, such as a dye or a pigment. Therefore, a necessity of increasing the thickness of the resin forming the base to attain a dark color does not arise easily. Therefore, a thin-film color filter is able to realize a clear and sufficient dark color. Thus, the influence of absorption of intrinsic light of the resin forming the base can be prevented, and therefore the displayed color cannot be subdued. Furthermore, a problem in that reduction in the quantity of transmitted light causes the image to be darkened can be prevented.

Even if the color is changed, the color filter can be formed thinly without a necessity of changing the thickness of the same. Therefore, the controllability of the gap in the liquid crystals can be improved.

A color filter provided individually from the alignment layer is not required so that a simple color liquid crystal display is formed.

The liquid crystal display, in which the alignment layer and the color filter are formed by a common member, enables the cost of the material to be reduced because the independent polarizing filter and the color filter can be omitted. Furthermore, the manufacturing processes can be decreased and thus the manufacturing cost can significantly be reduced.

Since the thickness of the liquid crystal display can be reduced, a further light weight and small size flat display can be realized.

The liquid crystal display according to the first embodiment comprises:

a pair of substrates disposed to face each other;

liquid crystal enclosed between the substrates;

a transparent electrode formed on either of the substrates;

an opposite electrode formed on the other substrate to face the transparent electrode;

alignment layers for holding the liquid crystals therebetween; and a polarizing filter formed on at least either of the pair of substrates, wherein the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, and the alignment layer is made of a compound having main chains, that are stable with respect to UV light, and side chains, each of which has an aliphatic ringing group to which aromatic groups are bonded, and which cross-link between the main chains, wherein the aromatic groups are aligned substantially in the first direction.

The liquid crystal display according to the present invention comprises the convex portions formed on the surface of the alignment layer, each of the convex portions being composed of longer side portion and the shorter side portion. Therefore, a sufficiently large pretilt angle can be obtained and therefore irregularity in the display frame can be prevented, generation of domains can be prevented, and the characteristics of the liquid crystal display can be improved.

Since the convex shape is repeatedly formed, irregularity of the distribution of the obtained pretilt angles in the frame cannot easily take place. Thus, irregularity of the display frame can be prevented.

Since the anchoring strength with respect to the liquid crystal mainly depends upon the alignment of the main chains of the molecules of the member for forming the alignment layer, excellent durability against external force and heat resistance can be obtained. As a result, the reliability of the liquid crystals can be improved.

The liquid crystal display according to the modification of the first embodiment is characterized in that the liquid crystal display according to the first embodiment comprises the alignment layer composed of the compound having the repetition structure unit expressed by the chemical formula ①.

The foregoing liquid crystal display is able to improve the effect obtainable from the structure according to claim 1.

The method of manufacturing a liquid crystal display according to the first method comprises the step of forming the alignment layer that has the steps of:

forming, on the substrate, a polymer resin film made of a compound having main chains, that are stable with respect to UV light, and side chains each having a functional group, which includes aromatic groups and multiple bonds that are capable of performing cross-linking reactions, and which absorbs light in the UV light region;

pressing, against the surface of the polymer resin film, a mold that has a pressing surface consisting of roof-like concave and convex rows, each of which is formed by repeatedly, in an arbitrary direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the arbitrary direction, are formed in a direction that is substantially perpendicular to the arbitrary direction so as to form, on the surface of the polymer resin film, concave and convex rows formed in a first direction and having a long repetition unit length and concave and convex rows formed in a second direction substantially perpendicular to the first direction and having a repetition unit length shorter than the repetition unit length of the concave and convex rows formed in the first direction; and irradiating the polymer resin film with UV light polarized in the second direction.

Since the foregoing manufacturing method uses the stamping method, dust and generation of static electricity can be prevented, the manufacturing cost can be reduced, a large area film can be manufactured and thus the method can be applied to a relatively-large liquid crystal display.

The foregoing manufacturing method enables the state of cross-linking of the alignment layer to generate anisotropy by adding a relatively simple process so that an alignment layer for a liquid crystal display having a large anchoring strength and exhibiting excellent vibration resistance and heat resistance is manufactured.

The manufacturing method according to a modification of the first method is characterized in that the compound for forming the polymer resin film to be formed on the substrate has a repetition structure unit expressed by the following chemical formula ②.

The foregoing manufacturing method is able to improve the effect obtainable from the structure according to the first method.

The apparatus for manufacturing an alignment layer of a liquid crystal display according to the second modification of the first method comprises:

a holding mechanism for holding a substrate on which a polymer resin film is formed;

a stamping mechanism for pressing, against the surface of the polymer resin film, a mold having, thereon, a concave and convex pattern to be stamped to the polymer resin film; and a polarized-UV-light irradiation mechanism having a UV light source and a polarizer for polarizing UV light from the UV light source to irradiate the polymer resin film formed on the substrate with polarized UV light.

The foregoing manufacturing apparatus is able to easily embody the manufacturing method according to the present invention so that an alignment layer for a liquid crystal display is manufactured in which the liquid crystal has a large anchoring strength and which exhibits excellent vibration resistance and heat resistance.

The liquid crystal display according to the second embodiment has the structure such that the polarizing filter is made a compound, which has main chains, that are stable with respect to UV light, and side chains, each of which has an aliphatic ringing group to which aromatic groups are bonded, and which cross-link between the main chains, and in which a dying functional group capable of absorbing light in a wavelength corresponding to the overall visible ray region is bonded to the aliphatic ringing group, wherein the side chains are aligned in substantially a predetermined direction.

The method of manufacturing a liquid crystal display according to the second method comprises the step of forming the polarizing filter having the steps of forming, on the substrate, a polymer resin film made of a compound having main chains, that are stable with respect to UV light, and side chains each having a functional group, which includes a dying functional group for absorbing light having the wavelength corresponding to substantially the overall visible ray region and a multiple bond that is capable of performing cross-linking reactions, and which absorbs light in the UV light region;

moving, in a contact manner, an aligning member on the surface of the polymer resin film in a predetermined direction; and irradiating the polymer resin film with UV light polarized in a direction perpendicular to the direction in which the aligning member is moved.

The polarizing filter of the liquid crystal display according to the second method of the present invention is manufactured by the manufacturing method according to the second method. The foregoing method comprises the step of irradiating the specific polymer resin film with UV light polarized into a predetermined direction to cause the polymer resin film to have the polarizing function having a polarizing axis according to the direction of polarization of UV light.

Therefore, when the polarizing filter is formed on the liquid crystal display, the polarizing direction of UV light to be applied is simply required to be adjusted with respect to the angle of the alignment axis of the liquid crystals. Thus, the conventional difficulty to perform accurate matching arising at the time of forming the polarizing filter can be prevented.

Furthermore, the liquid crystal displays can be manufactured in an in-line and non-contact manner in a clean room exhibiting excellent cleanliness, mixture of foreign matters and generation of static electricity can be prevented.

Since the polarizing function is given by applying predetermined and polarized UV light, repeated manufacturing of polarizing filters with respect to a plurality of pixels can easily be performed.

The liquid crystal display according to the third embodiment has the structure that the color filter is made of a compound which has main chains, that are stable with respect to UV light, and side chains each of which has an aliphatic ringing group to which aromatic groups are bonded, and which cross-link between the main chains, wherein a dying functional group is bonded to the aliphatic ringing group.

The foregoing color filter according has the structure that chemical reactions realized by bonding the dying functional group as the substituent of the compound are used to color the color filter in place of adding a dye or a pigment. The adjustment of the density of each color is not performed by an additive, such as a dye or a pigment. Therefore, a necessity of increasing the thickness of the resin forming the base to attain a dark color does not arise easily. Therefore, a thin-film color filter is able to realize a clear and sufficient dark color.

Even if the color is changed, the color filter can be formed thinly without a necessity of changing the thickness of the same. Therefore, the controllability of the thickness of the liquid crystal can be improved.

The liquid crystal display according to the first modification of the third embodiment includes is characterized in that the liquid crystal display according to the third embodiment has the structure that the dying functional group is a dying functional group that passes light having the wavelength corresponding to any of green, blue or red.

Since the dying functional group of the foregoing liquid crystal display is set into three primary colors, all colors can be expressed by combining the three primary colors.

The method of manufacturing a liquid crystal display according to the third embodiment is characterized in that step of forming the color filter has the steps of forming, on the substrate, a polymer resin film made of a compound having main chains, that are stable with respect to UV light, and side chains each having a functional group, which includes a dying functional group for absorbing light in a portion of the wavelength in the visible ray region and a multiple bond that is capable of performing cross-linking reactions, and which absorbs light in the UV light region, and irradiating the polymer resin film with UV light.

The foregoing manufacturing method is able to easily manufacture the color filter of the liquid crystal display according to the third embodiment.

The method of manufacturing a liquid crystal display according to a modification of the above method includes the is characterized in that the liquid crystal display according to the above method has the structure that the dying functional group is a dying functional group that passes light having the wavelength corresponding to any of green, blue or red.

The foregoing method enables a liquid crystal display to be manufactured that is able to express all colors.

The liquid crystal display according to the fourth embodiment has the structure that the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound having main chains, that are stable with respect to UV light, and side chains each of which has an aliphatic ringing group to which aromatic groups are bonded, and which cross-link between the main chains, the aromatic groups are aligned substantially in the first direction, and the polarizing filter is made of a compound in which a dying functional group for absorbing light having the wavelength corresponding to substantially the overall visible ray region or a dying functional group for absorbing light having the wavelength corresponding to a specific visible ray region is bonded to the aliphatic ringing group of the compound forming the alignment layer, and the side chains are aligned in a substantially predetermined direction.

The foregoing liquid crystal display comprises the polarizing filter that is made of the compound in which the dying functional group is introduced into the compound for use to form the alignment layer. Therefore, substantially the same compounds can be used to form the alignment layer and the polarizing filter.

Therefore, the necessity of using other and individual materials can be eliminated, and therefore the cost of the material can significantly be reduced.

The liquid crystal display according to the fifth embodiment has the structure that the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction.

the alignment layer is made of a compound having main chains, that are stable with respect to UV light, and side chains each of which has an aliphatic ringing group to which aromatic groups are bonded, and which cross-link between the main chains, wherein the aromatic groups are aligned substantially in the first direction, and the color filter is made of a compound in which a dying functional group for passing light in a portion of the wavelength of the visible ray region is bonded to the aliphatic ringing group of the compound forming the alignment layer.

The liquid crystal display according to the fifth embodiment of the present invention comprises the color filter that is made of the compound in which the dying functional group is introduced into the compound for use to form the alignment layer. Therefore, substantially the same compounds can be used to form the alignment layer and the color filter. Therefore, the necessity of using other and individual materials can be eliminated, and therefore the cost of the material can significantly be reduced.

The liquid crystal display according to the sixth embodiment has the structure that the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound which comprises main chains, that are stable with respect to UV light, and side chains each of which has an aliphatic ringing group to which aromatic groups are bonded, and which cross-link between the main chains, and in which a dying functional group for absorbing light having the wavelength corresponding to substantially the overall visible ray region is bonded to the aliphatic ringing group, and the aromatic groups and the side chains are aligned substantially in the first direction.

The liquid crystal display according to the sixth embodiment comprises the alignment layer that is formed by using the stamping method. However, the force for maintaining the shape of the concave and convex pattern of the alignment layer is satisfactory, and therefore a sufficiently large pretilt angle can be maintained. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration resistance and heat resistance can be obtained, and the reliability as the liquid crystal display can be improved.

The alignment layer has the function to serve as the polarizing filter which requires that the direction, in which the aligning member, such as a rubber roller, is moved, and direction of polarization of UV light to be applied are adjusted with respect to the angle of the axis of alignment of liquid crystals. Therefore, the conventional difficulty arising in accurate matching at the time of forming the polarizing filter can be moderated.

Furthermore, the liquid crystal displays can be manufactured in an in-line and non-contact manner in a clean room exhibiting excellent cleanliness so that mixture of foreign matters and generation of static electricity are prevented.

Since the polarizing function is given by applying predetermined and polarized UV light, repeated manufacturing of the polarizing filters having the same characteristics with respect to a plurality of pixels can easily be performed.

Therefore, the requirements in the manufacturing process can be moderated so that a liquid crystal display having a high quality polarizing filter is obtained by a simple manufacturing method.

Furthermore, the directions of polarization of polarizing filters with respect to a plurality of liquid crystal displays can easily be maintained. Thus, relative scattering among a plurality of liquid crystal displays can be prevented, and thus the manufacturing yield can be improved.

The liquid crystal display having the structure, in which the alignment layer and the polarizing filter are formed by a common member, enables the cost of the material to be reduced because the independent polarizing filter can be omitted. Furthermore, the manufacturing processes can be decreased and thus the manufacturing cost can significantly be reduced. Since the thickness of the liquid crystal display can be reduced, a further light weight and small size flat display can be realized.

The liquid crystal display according to the seventh embodiment has the structure that the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound which comprises main chains, that are stable with respect to UV light, and side chains each of which has an aliphatic ringing group to which aromatic groups are bonded, and which cross-link between the main chains, and in which a dying functional group for absorbing light in a portion of the wavelength of the visible ray region is bonded to the aliphatic ringing group, and the aromatic groups are aligned substantially in the first direction.

The liquid crystal display according to the seventh embodiment of the present invention comprises the alignment layer made of the specific compound in which the dying functional group is bonded. In this case, a liquid crystal display, in which a color alignment layer is applied to each pixel, is realized. Therefore, light beams are made to be colored polarized beams for respective colors when the beams are allowed to pass through the alignment layer. Thus, the necessity of providing a color filter individually from the alignment layer can be eliminated when a color liquid crystal display is formed.

The liquid crystal display having the structure, in which the alignment layer and the color filter are formed by a common member, enables the cost of the material to be reduced because the independent color filter can be omitted. Furthermore, the manufacturing processes can be decreased and thus the manufacturing cost can significantly be reduced. Since the thickness of the liquid crystal display can be reduced, a further light weight and small size flat display can be realized.

The liquid crystal display according to the eighth embodiment has the structure that the alignment layer has, on the surfaces thereof, roof-like concave and convex rows, each of which is formed by repeatedly, in a first direction, forming convex portions each of which consists of a longer side portion and a shorter side portion, and valley-like concave and convex rows, the height of which is lower than that of the roof-like concave and convex rows and which are formed in the same direction as that of the roof-like concave and convex rows in such a manner that the roof-like concave and convex rows and the valley-like concave and convex rows are adjacently and alternately formed so that concaves and convexes having a unit length of repetition, that is shorter than a unit length of repetition of the concaves and convexes formed in the first direction, are formed in a second direction that is substantially perpendicular to the first direction, the alignment layer is made of a compound which comprises main chains, that are stable with respect to UV light, and side chains each of which has an aliphatic ringing group to which aromatic groups are bonded, and which cross-link between the main chains, and in which a dying functional group for absorbing light in a portion of the wavelength of the visible ray region is bonded to the aliphatic ringing group, and the aromatic groups and the side chains are aligned substantially in the first direction.

The liquid crystal display according to the eighth embodiment comprises the alignment layer that has the large force for maintaining the shape of the concave and convex pattern of the alignment layer, and therefore a sufficiently large pretilt angle can be maintained, similarly to the liquid crystal display according to the first embodiment. Thus, generation of domain can be prevented. Since the force for maintaining the shape of the concave and convex pattern of the alignment layer is satisfactorily large, disorder of the concave and convex pattern can be prevented. As a result, irregularity in the display frame of the liquid crystal display can be prevented satisfactorily. Furthermore, excellent vibration resistance and heat resistance can be obtained, and the reliability as the liquid crystal display can be improved.

The alignment layer has the function to serve as the polarizing filter which is realized in such a manner that the direction, in which the aligning member is moved, and direction of polarization of UV light to be applied are adjusted with respect to the angle of the axis of alignment of liquid crystals. Therefore, the conventional difficulty arising in accurate matching at the time of forming the polarizing filter can be moderated.

Furthermore, the liquid crystal displays can be manufactured in an in-line and non-contact manner in a clean room exhibiting excellent cleanliness so that mixture of foreign matters and generation of static electricity are prevented.

Since the polarizing function is given by applying predetermined and polarized UV light, repeated manufacturing of the polarizing filters having the same characteristics with respect to a plurality of pixels can easily be performed.

Therefore, the requirements in the manufacturing process can be moderated so that a liquid crystal display having a high quality polarizing filter is obtained by a simple manufacturing method.

Furthermore, the directions of polarization of polarizing filters with respect to a plurality of liquid crystal displays can easily be maintained. Thus, relative scattering among a plurality of liquid crystal displays can be prevented, and thus the manufacturing yield can be improved.

Light beams allowed to pass through the alignment layer are made to be colored polarized light beams for the respective colors. Thus, the alignment layer has the function to serve as the color filter. The color filter has the structure that no dyestuff nor pigment is added and that the adjustment of the density of each color is not performed by an additive, such as a dye or a pigment. Therefore, a necessity of increasing the thickness of the resin forming the base to attain a dark color does not arise easily. Therefore, a thin-film color filter is able to realize a clear and sufficient dark color. Thus, the influence of absorption of intrinsic light of the resin forming the base can be prevented, and therefore the displayed color cannot be subdued. Furthermore, a problem in that reduction in the quantity of transmitted light causes the image to be darkened can be prevented.

Even if the color is changed, the color filter can be formed thinly without a necessity of changing the thickness of the same. Therefore, the controllability of the thickness of the liquid crystals can be improved.

A color filter provided individually from the alignment layer is not required so that a simple color liquid crystal display is formed.

The liquid crystal display, in which the alignment layer and the color filter are formed by a common member, enables the cost of the material to be reduced because the independent polarizing filter and the color filter can be omitted. Furthermore, the manufacturing processes can be decreased and thus the manufacturing cost can significantly be reduced.

Since the thickness of the liquid crystal display can be reduced, a further light weight and small size flat display can be realized.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A liquid crystal display comprising:

first and second substrates having opposing surfaces;

liquid crystal disposed between the opposing surfaces of said first and second substrates;

a transparent electrode formed on said first substrate;

an opposite electrode formed on said second substrate;

first and second alignment layers respectively formed on the first and second substrates and contacting said liquid crystal disposed therebetween; and a polarizing filter formed on at least one of said first and second substrates, wherein respective surfaces of said first and second alignment layers include a plurality of parallel, continuous convex ridges, each adjacent pair of said plurality of ridges being separated by a continuous groove, wherein each of said plurality of ridges has an irregular, asymmetric repeated form in a longitudinal direction and in a width direction, the repeated form in the longitudinal direction being longer than that in the width direction, wherein said first and second surfaces are entirely defined by said plurality of ridges and associated grooves such that all portions of the first and second surfaces of the alignment layer are curved with respect to said first and second substrates, wherein said alignment layer consists of a compound having a repetition structure unit expressed by the following chemical formula:

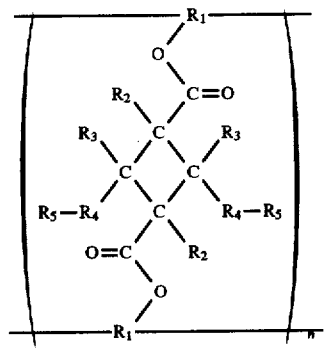

wherein said aromatic groups of each of said repeating structural unit are aligned substantially in said longitudinal direction, where R1 is selected from a group consisting of

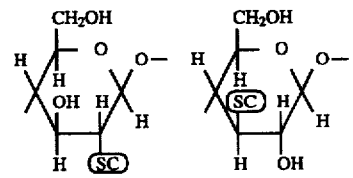

-continued

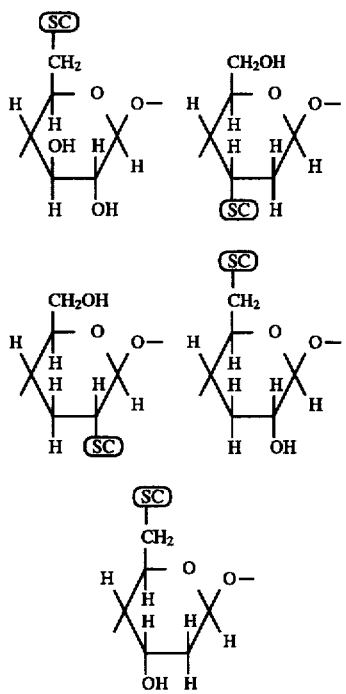

where R2 is —H, R3 is —H, R4 is —C6H4, and R5 is selected from a group consisting of —NO2, —CN and —C6H4CN.

2. A liquid crystal display comprising:

first and second substrates having opposing surfaces;

liquid crystal disposed between the opposing surfaces of said first and second substrates;

a transparent electrode formed on said first substrate;

an opposite electrode formed on said second substrate opposite said transparent electrode;

first and second alignment layers respectively formed on the first and second substrates and contacting said liquid crystal disposed therebetween; and a polarizing filter formed on at least one of said first and second substrates, wherein said polarizing filter consisting of a compound having a repetition structure unit expressed by the following chemical formula:

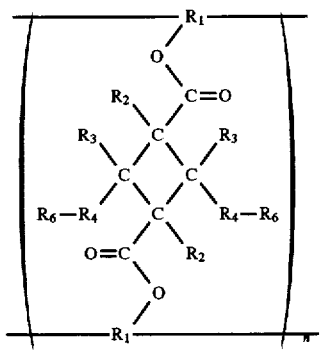

where R1 is selected from a group consisting of

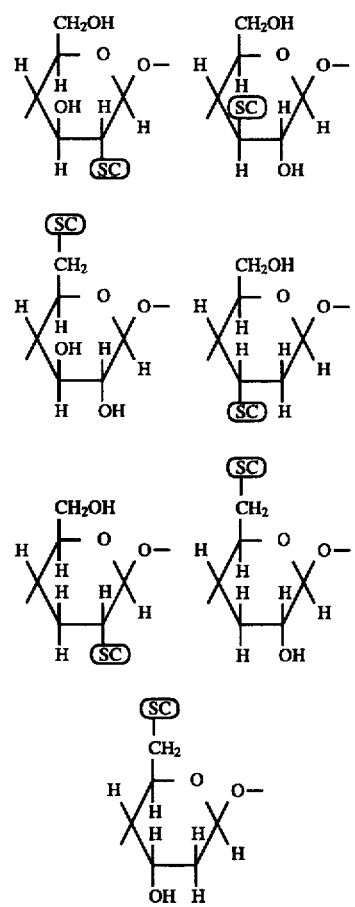

where R2 is —H, R3 is —H, R4 is —C6H4, and R6 consists of a dying functional group capable of absorbing light in a wavelength corresponding to the overall visible ray region which is bonded to the aliphatic ringing group of the repetition structure unit, and wherein said side chains are aligned in substantially a predetermined direction.

3. A liquid crystal display comprising:

first and second substrates having opposing surfaces;

liquid crystal disposed between the opposing surfaces of said first and second substrates;

a transparent electrode formed on said first substrate;

an opposite electrode formed on said second substrate opposite said transparent electrode;

first and second alignment layers respectively formed on the first and second substrates and contacting said liquid crystal disposed therebetween;

a polarizing filter formed on at least one of said first and second substrates; and a color filter formed on either or both of said substrates, wherein said color filter consists of a compound having a repetition structure unit expressed by the following chemical formula:

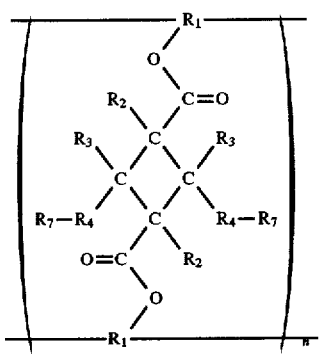

where R1 is selected from a group consisting of

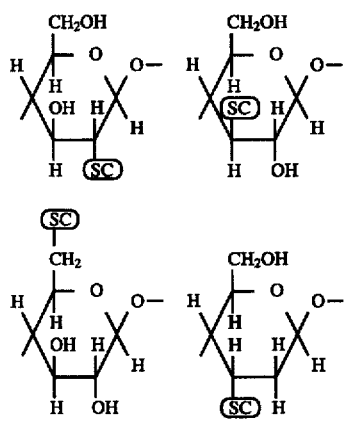

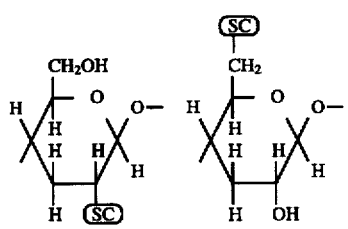

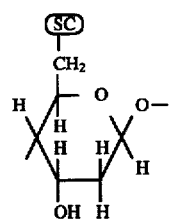

where R2 is —H, R3 is —H, R4 is —C6H4, and R7 is a dying functional group is bonded to the aliphatic ringing group of the repetition structure unit.

4. A liquid crystal display according to claim 3, wherein said dying functional group is a dying functional group that passes light having the wavelength corresponding to any of green, blue or red light.

* * * * *